United States Patent
Baldwin et al.

(10) Patent No.: US 7,155,243 B2
(45) Date of Patent: Dec. 26, 2006

(54) METHODS, SYSTEMS, AND COMPUTER PROGRAM PRODUCTS FOR CONTENT-BASED SCREENING OF MESSAGING SERVICE MESSAGES

(75) Inventors: Patricia A. Baldwin, Raleigh, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 0 days.

(21) Appl. No.: 11/153,095

(22) Filed: Jun. 15, 2005

(65) Prior Publication Data

US 2005/0278620 A1    Dec. 15, 2005

Related U.S. Application Data

(60) Provisional application No. 60/579,847, filed on Jun. 15, 2004.

(51) Int. Cl.
*H04Q 7/20* (2006.01)
(52) U.S. Cl. .................. 455/466; 455/410; 455/412.1; 455/412.2
(58) Field of Classification Search .............. 455/410, 455/466, 412.1, 412.2
See application file for complete search history.

(56) References Cited

U.S. PATENT DOCUMENTS

| | | | |
|---|---|---|---|
| 5,579,372 A | 11/1996 | Åstr om | |
| 5,701,301 A | 12/1997 | Weisser, Jr. | |
| 5,742,905 A | 4/1998 | Pepe et al. | |
| 5,768,509 A | 6/1998 | Gunluk | |
| 5,903,726 A | 5/1999 | Donovan et al. | |
| 5,930,239 A | 7/1999 | Turcotte | |
| 5,987,323 A | 11/1999 | Huotari | |
| 6,101,393 A | 8/2000 | Alperovich et al. | |
| 6,108,325 A | 8/2000 | Stephanson et al. | |
| 6,108,559 A | 8/2000 | Astrom et al. | |
| 6,125,281 A | 9/2000 | Wells et al. | |
| 6,175,743 B1 | 1/2001 | Alperovich et al. | |
| 6,223,045 B1 | 4/2001 | Valentine et al. | |
| 6,259,925 B1 | 7/2001 | Josse | |
| 6,289,223 B1 | 9/2001 | Mukherjee et al. | |
| 6,301,484 B1 | 10/2001 | Rogers et al. | |
| 6,400,942 B1 | 6/2002 | Hansson et al. | |
| 6,418,305 B1 | 7/2002 | Neustein | |
| 6,563,830 B1 | 5/2003 | Gershon et al. | |
| 6,795,708 B1 | 9/2004 | Patel | |

(Continued)

FOREIGN PATENT DOCUMENTS

WO    WO 03/026331    3/2003

(Continued)

OTHER PUBLICATIONS

Commonly-assigned, co-pending U.S Appl. No. 11/224,295 for "Methods, Systems, and Computer Program Products for Short Message Service (SMS) SPAM Filtering Using E-mail SPAM Filtering Resources," (Unpublished, filed Sep. 12, 2005).

(Continued)

*Primary Examiner*—Temica Beamer
(74) *Attorney, Agent, or Firm*—Jenkins, Wilson, Taylor, & Hunt, P.A.

(57) ABSTRACT

Methods, systems, and computer program products for content-based screening of messaging service (MS) messages, such as short message service messages and multimedia message service messages, are disclosed. MS subscribers may provision specific message content screening rules via a web interface. Content-based MS screening functionality may be applied in the core of a communications network, such as at a network signaling node separate from a short message service center or a mobile terminal.

64 Claims, 10 Drawing Sheets

U.S. PATENT DOCUMENTS

| | | |
|---|---|---|
| 6,819,932 B1 | 11/2004 | Allison et al. |
| 6,865,191 B1 | 3/2005 | Bengtsson et al. |
| 2001/0005678 A1 | 6/2001 | Lee |
| 2001/0006897 A1 | 7/2001 | Kang et al. |
| 2001/0041579 A1 | 11/2001 | Smith et al. |
| 2002/0159387 A1 | 10/2002 | Allison et al. |
| 2003/0009698 A1 | 1/2003 | Lindeman et al. |
| 2005/0020289 A1 | 1/2005 | Kim et al. |
| 2005/0101306 A1 | 5/2005 | Zabawskyj et al. |
| 2005/0186974 A1* | 8/2005 | Cai .......................... 455/466 |

FOREIGN PATENT DOCUMENTS

| | | |
|---|---|---|
| WO | WO 2004/012470 | 2/2004 |
| WO | WO 2004/059959 | 7/2004 |

OTHER PUBLICATIONS

Notification of Transmittal of International Preliminary Examination Report in International Application No. PCT/US02/06380 (Mar. 13, 2003).

Written Opinion in International Application No. PCT/US02/06380 (Nov. 27, 2002).

Notification of Transmittal of the International Search Report or the Declaration in International Application No. PCT/US02/06380 (Jun. 21, 2002).

J. Klensin, "Simple Mail Transfer Protocol," Network Working Group, pp. 1-79 (Apr. 2001).

Myers et al., "Post Office Protocol—Version 3," Network Working Group, http://www.ietf.org/rfc1939.txt, pp. 1-22 (May 1996).

"Camelot Messaging Security Suite v1.0," Atrium Software http://www.atrium-softwareusa.com/en/camelot/camelot$_{13}$ overview.html, pp. 1-3 (publication date unknown) (Web page copyright 1998-2002).

"Mercur SMS Pager Gateway," Atrium Software International, http://atrium-softwareusa.com/EN/mcrsmspager_products.html, p. 1 (publication date unknown) (Web page copyright 1998-2002).

"Wireless Application Protocol Architecture Specification WAP-210-WAPArch-20010712," WAP Architecture, Version Jul. 12, 2001, pp. 1-24.

"Cisco IP Transfer Point as the Signaling Gateway for the Cisco BTS 10200 Softswitch," Cisco Systems, Inc., pp. 1-10 (Summer 2004), no month listed.

"Cisco IP Transfer Point as the Signaling Gateway for the Cisco PGW 2200 Softswitch," Cisco Systems, Inc., p. 1-11 (Summer 2004), no month listed.

"Next-Generation Signaling Transports Cisco IP Transfer Point," Cisco Systems, Inc., pp. 1-27 (Summer 2004), no month listed.

"A Study in Mobile Messaging: The Evolution of Messaging in Mobile Networks, and How Efficiently and Effectively Manage the Growing Messaging Traffic," White Paper, Cisco Systems, Inc., pp. 1-6 (Spring 2004), no month listed.

"Cisco ITP Multilayer Routing (MLR) SMS MO Routing Requirements," Cisco Systems, Inc., p. 1 (Copyright 2004), no month listed.

"Cisco Signaling Gateway Manager Release 3.2 For Cisco IP Transfer Point," Cisco Systems, Inc., pp. 1-9 (Copyright 1992-2004), no month listed.

"Solutions for Mobile Network Operators," Cisco Systems, Inc., pp. 1-8 (Copyright 1992-2004), no month listed.

Moodie, "Agilent acceSS7: White Paper," Agilent Technologies, pp. 1-14 (Apr. 1, 2003).

"Cisco IP Transfer Point," Cisco Systems, Inc., pp. 1-10 (Copyright 1992-2003), no month listed.

"Cisco IP Transfer Point Multilayer Short Message Service Routing Solution," Cisco Systems, Inc., pp. 1-6 (Copyright 1992-2003), no month listed.

"Cisco ITP MAP Gateway for Public WLAN SIM Authentication and Authorization," Cisco Systems, Inc., pp. 1-13 (Copyright 1992-2003), no month listed.

Barry, "A Signal for Savings," PACKET, Cisco Systems Users Magazine, vol. 14, No. 4, pgs. Cover; 19-21; and 81 (Fourth Quarter 2002), no month listed.

"Agilent Technologies and Cisco Systems SS7 over IP White Paper," Cisco Systems, Inc. and Agilent Technologies, pp. 1-6 (Copyright 2002—Printed in the UK Feb. 1, 2002).

"Cisco IP Transfer Point: MTP3 User Adaptation (M3UA) and SCCP USer Adaptation (SUA) Signaling Gateway," Cisco Systems, Inc., pp. 1-14 (Copyright 2002), no month listed.

"Cisco SS7 Port Adapter for the Cisco 7500 Versatile Interface Processor and 7200 VXR Routers Provide High-Density SS7 Aggregation," Cisco Systems, Inc., pp. 1-5 (Copyright 1992-2002), no month listed.

"Next-Generation SS7 Networks with the Cisco IP Transfer Point," Cisco Systems, Inc., pp. 1-14 (Copyright 1992-2002), no month listed.

"Agilent acceSS7 Business Intelligence," Agilent Technologies, pp. 1-6 (Copyright 2001—Printed in the UK Nov. 30, 2001).

"Cisco IP Transfer Point (ITP) Network Management Product Presentation," Cisco Systems, Inc., pp. 1-20 (Copyright 2001), no month listed.

"Networkers," Cisco Systems, Inc., pp. 1-60 (Copyright 2001), no month listed.

"Cisco SS7 Signaling Offload," Cisco Systems, Inc., pp. 1-33 (Copyright 1992-2001), no month listed.

Topsail Beach—SS7 Over IP—Cisco Systems, Inc., pp. 1-16 (Copyright 1999), no month listed.

"Chapter 1: Overview," SS7 Port Adapter Installation and Configuration, pp. 1-1-1-8 (Publication Date Unknown).

"Configuring ITP Basic Functionality," IP Transfer Point, Cisco IOS Release 12.2(4)MB12, pp. 31-50 (Publication Date Unknown).

"Configuring ITP Optional Features," IP Transfer Point, Cisco IOS Release 12.2(4)MB12, pp. 65-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and SUA SS7 Over IP Signaling Gateways," IP Transfer Point, Cisco IOS Release 12.2(4)MB10, pp. 49-62 (Publication Date Unknown).

* cited by examiner

US 7,155,243 B2

METHODS, SYSTEMS, AND COMPUTER PROGRAM PRODUCTS FOR CONTENT-BASED SCREENING OF MESSAGING SERVICE MESSAGES

RELATED APPLICATIONS

This application claims the benefit of U.S. provisional patent application No. 60/579,847 filed Jun. 15, 2004, the disclosure of which is incorporated herein by reference in its entirety.

TECHNICAL FIELD

The subject matter described herein relates to methods, systems, and computer program products for screening and preventing delivery of unwanted multimedia message service (MMS) and short message service (SMS) messages to a subscriber in a mobile communications network. More particularly, the present invention relates to methods, systems, and computer program products for intercepting and discarding unwanted MMS and SMS messages based on message content or an attribute of message content.

BACKGROUND ART

Short message service (SMS) is a telecommunications service that enables mobile subscribers to easily send and receive text messages via wireless handsets. More recently, multimedia message service (MMS) has emerged as a medium for enabling mobile subscribers to send and receive multimedia information, such as text, graphics, audio, and video information. As convergence of wireless communication networks and Internet data networks has grown, the sending and receiving of SMS and MMS messages via Internet-connected computer terminals has also become commonplace.

SMS service provides a mechanism for transmitting "short" text messages to and from SMS capable terminals (e.g., wireless handsets, personal computers, etc.) via the signaling component of the wireless communication network. For example, in a global system for mobile communications (GSM) network, the mobile application part (MAP) protocol, in conjunction with the signaling system 7 (SS7) or Internet Engineering Task Force (IETF) SIGTRAN protocols, is used to facilitate the delivery of SMS messages via a signaling network. With particular regard to the sending and receiving of SMS messages by a wireless handset, a wireless communication network provides the transport facilities necessary to communicate short messages between a store-and-forward short message service center (SMSC) and a wireless handset.

Those skilled in the art of telecommunications messaging services, such as SMS and MMS services, will appreciate that the SMS components of a wireless communication network will diligently attempt to deliver every SMS message that is received by the network. While such guaranteed delivery service is an attractive feature or attribute of SMS system operation, the delivery of each and every SMS message addressed to a particular subscriber may not always be desired. SMS subscribers often find themselves the target of unwanted SMS messages, often referred to as "spam" or "junk" messages. Not only are such SMS "spam" messages annoying to mobile subscribers, but from a network operations perspective, large volumes of SMS "spam" messaging traffic has the potential to inflict a significantly negative impact on overall network performance. One conventional solution to screening SMS messages is described in commonly-assigned, U.S. Pat. No. 6,819,932, the disclosure of which is incorporated herein by reference in its entirety. This solution includes screening messages based on called and calling party numbers in the signaling messages that carry SMS content. While such a solution provides an effective method for screening messages to or from a particular party, spam SMS message generators may initially be unknown. Thus, it may not be possible to define an SMS screening rule based on an SMS sender because the sender is initially unknown. Also, clever creators of mass spam attacks often insert randomly generated sender identifiers, making it impossible to determine the senders to block.

Similar to SMS, MMS service provides a mechanism for transmitting multimedia messages (e.g., audio, video, graphics, text, etc.) to and from multimedia-capable terminals (e.g., wireless handsets, personal computers, PDAs, network application servers, etc.) via a wireless communication network. A variety of techniques and associated protocols have been created to provide MMS services including wireless application protocol (WAP), wireless transaction protocol (WTP), wireless session protocol (WSP), and hypertext transfer protocol (HTTP). According to one MMS communication technique, a WAP-based MMS message is communicated via a wireless network from a sending subscriber to a WAP gateway function using a MMS encapsulation (MMSE) protocol. The WAP gateway function removes WAP information from the message and package the MMS content in an HTTP-based message. The HTTP-based MMS message is subsequently communicated via an IP network to a MMS relay/server function. The MMS relay/server function performs store-and-forward processing on the MMS message.

While the store-and-forward mechanisms associated with SMS and MMS are not identical, the same potential spam problem exists for MMS messages as for SMS messages, and MMS subscribers/network operators need effective, flexible screening techniques for dealing with this MMS spam problem.

As such, there exists a need for novel methods and systems for preventing the delivery of unwanted messages (e.g., SMS, MMS) to a mobile subscriber and also to eliminate such unwanted message traffic from an operator's network so that valuable network resources (e.g., communication link bandwidth, SMSC nodes, MMS relays/servers, HLR nodes, VLR nodes, etc.) are not burdened by spam message traffic.

DISCLOSURE OF THE INVENTION

According to one aspect, the subject matter described herein includes a method for screening messaging service (MS) service messages. The method includes, at a network signaling node separate from a short message service center (SMSC): receiving an MS message that includes message recipient identification information and MS content, performing a lookup in a content-based MS screening rule database including content-based screening rules associated with at least one message recipient using the message recipient identification and content information, and in response to locating a matching entry performing a screening action specified by the entry.

Performing the content-based MS screening steps at a signaling nodes separate from the SMSC reduces the processing load on the SMSC over SMSC-based screening solutions. In addition, because the screening is performed at a network signaling node that performs at least one signaling function in addition to message screening, the need for specialized stand-alone screening nodes is reduced. Performing the screening at a network signaling node also reduces the processing burden on mobile terminals over screening solutions that are mobile-terminal-based. In addition, the likelihood of losing an MS screening rule set is reduced over mobile-terminal-based solutions, since mobile terminals are often lost, damaged, or stolen.

As used herein, the term "messaging service (MS) messages" refers to any type of messages that are sent between end users independent of voice calls. Examples of such messages include SMS messages sent by computers, SMS messages sent by mobile handsets, SMS over wireline messages, multimedia message service (MMS) messages, and instant messages. Examples of message content and message content attributes include words, language, content size, and content type. In one implementation, messages that fail the content-based screening may be discarded, or alternatively re-directed to another destination address.

According to another aspect, the subject matter described herein includes a signaling message routing node that is adapted to transmit and receive messaging service packets, such as short message service (SMS) and multimedia message service (MMS) message packets, via a communications network. The routing node includes a content-based message screening application. The content-based message screening application receives and screens messaging service messages based on the message content or attributes of the message content.

The content-based message screening application may also generate a new message addressed to the sending or calling party associated with a discarded message. The new message may notify the sending party that delivery of the discarded message was unsuccessful. Content-based screening criteria may be entered and administered by a subscriber via an easy to use interface, such as a graphical user interface (GUI) available via a web server. For example, a subscriber may define a screening rule for SMS messages, which causes all SMS messages destined for the subscriber that contain the word "Viagra" to be discarded. In another example, a subscriber may define a screening rule for MMS messages, which causes all MMS messages destined for the subscriber that contain JPEG images larger than 1 megabyte in size to be discarded. Alternatively, the subscriber may specify a screening rule for MMS messages, which causes all MMS messages destined for the subscriber that contain JPEG images larger than 1 megabyte in size to be re-directed to an electronic mail (Email) account associated with the subscriber.

According to another aspect of the subject matter described herein, a content-based message screening application may examine message origination information (e.g., sending party, originating network address, other routing information) contained in a received message to determine the source of a "spam" messaging originator. As such, it may be possible for a content-based screening application of the present invention to identify the particular network, network elements, or communication terminal(s) from which "spam" messaging is originating. If the origin of such "spam" messaging can be determined, an alarm or notification message may be generated that is adapted to notify one or more network operators of the incident so that appropriate steps can be taken to eliminate the "spam" originator's access to an operator's network and network resources (e.g., SMSC, MMS relay/server, HLR, VLR, MSC, etc.).

The subject matter described herein for providing content-based SMS screening may be implemented using a computer program product comprising computer executable instructions embodied in a computer readable medium. Exemplary computer readable media suitable for implementing the subject matter described herein include disk memory devices, programmable logic devices, application specific integrated circuits, and downloadable electrical signals. In addition, a computer readable medium that implements the subject matter described herein may be distributed across multiple physical devices and/or computing platforms.

Accordingly, it is an object of the subject matter described herein to allow a messaging service subscriber to specify content-based screening criteria, which are subsequently used to screen messaging service messages that are sent to the subscriber.

It is another object of the subject matter described herein to enable a messaging service subscriber to control the type of messaging content that is delivered to a messaging service terminal.

Some of the objects of the subject matter described herein having been stated hereinabove, other objects will be evident as the description proceeds, when taken in connection with the accompanying drawings as best described hereinbelow.

BRIEF DESCRIPTION OF THE DRAWINGS

A description of the present subject matter will now proceed with reference to the accompanying drawings of which.

DETAILED DESCRIPTION OF THE INVENTION

Figure 1:
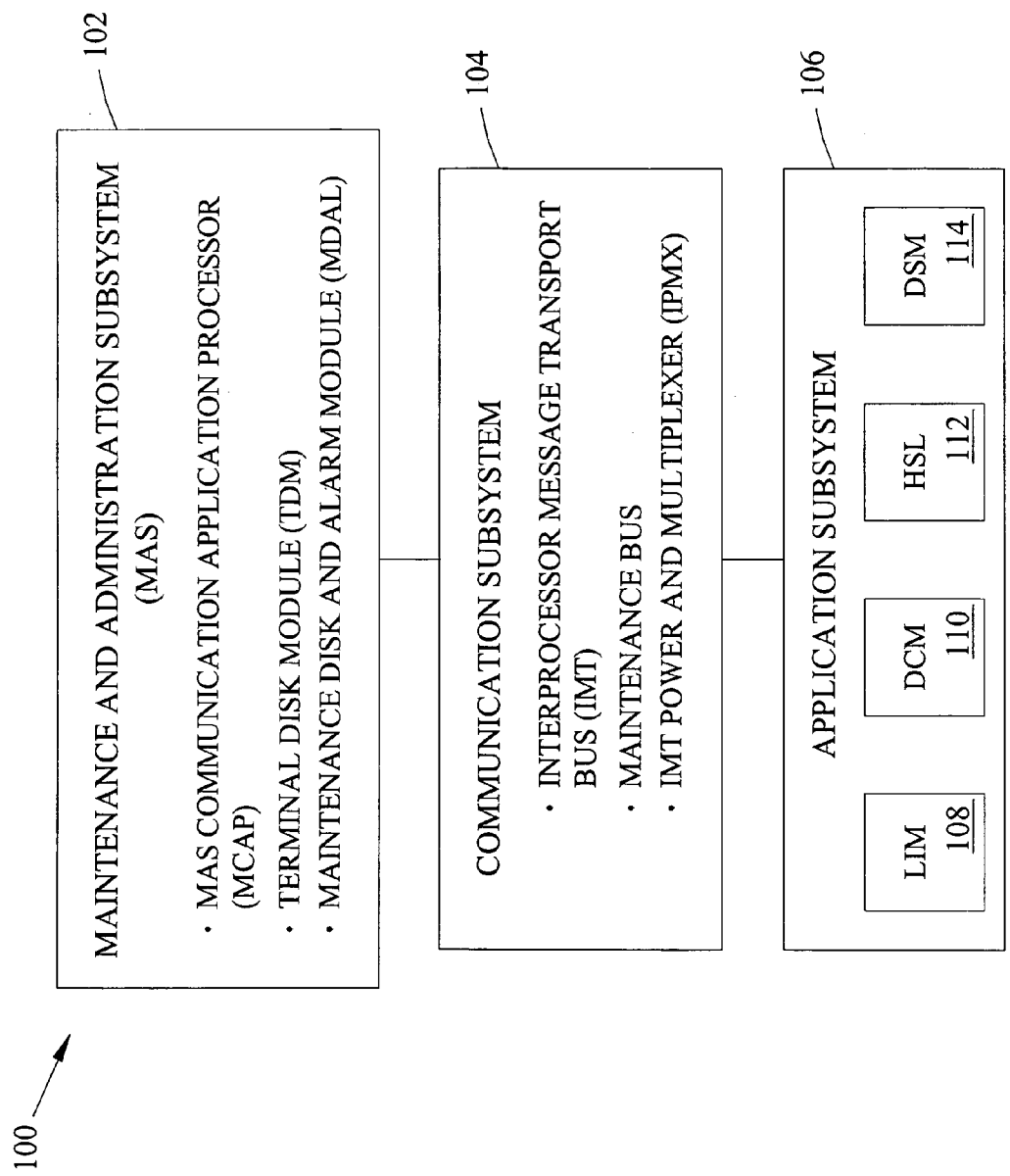
FIG. 1 is a block diagram illustrating an exemplary architecture of a signaling gateway (SG) routing node suitable for use with embodiments of the subject matter described herein.

The methods and systems described herein for content-based screening of messaging service messages may be implemented using any suitable hardware platform capable of receiving and processing messaging service messages. One example of such a platform is a signaling message routing node, such as a signaling system 7 (SS7) signal transfer point (STP) or SS7 Internet protocol (IP)-capable signaling gateway (SG) routing node. Examples of suitable commercially available signaling message routing nodes include the EAGLE® STP and the IP[7] Secure Gateway®, both available from Tekelec of Calabasas, Calif. A block diagram that generally illustrates the base internal architecture of the IP[7] Secure Gateway® is shown in FIG. 1. In FIG. 1, an IP[7] Secure Gateway® 100 includes the following subsystems: a maintenance and administration subsystem (MAS) 102, a communication subsystem 104, and an application subsystem 106. MAS 102 provides maintenance communications, initial program load, peripheral services, alarm processing and system disks. Communication subsystem 104 includes an interprocessor message transport (IMT) bus that is the main communication bus among all subsystems in IP[7] Secure Gateway® 100. The IMT bus includes two 1 Gbps counter-rotating rings. Application subsystem 106 includes application cards or modules (e.g., printed circuit boards) capable of communicating with the other cards through the IMT bus. Numerous types of application cards can be incorporated into SG 100, including a link interface module (LIM) 108 that interfaces with SS7 links and X.25 links. SG 200 may also include a data communications module (DCM) 110 that provides an IP signaling interface. DCM 210 may support SS7-over-IP adaptation protocols (e.g., Internet Engineering Task Force SIGTRAN protocols, Tekelec's transport adapter layer interface, etc.) or other signaling protocols (e.g., session initiation protocol, H.323, wireless application protocol, etc.). SG 200 may further include a high-speed link (HSL) module 112 that provides signaling (e.g., SS7, SIGTRAN, SIP, H.323, etc.) over asynchronous transfer mode (ATM) links SG 200 may further include a database services module (DSM) 114 that provides database services, such as global title translation, number portability translation, messaging service (MS) screening, and others.

Exemplary Routing Node Architecture and Operation

Figure 2:
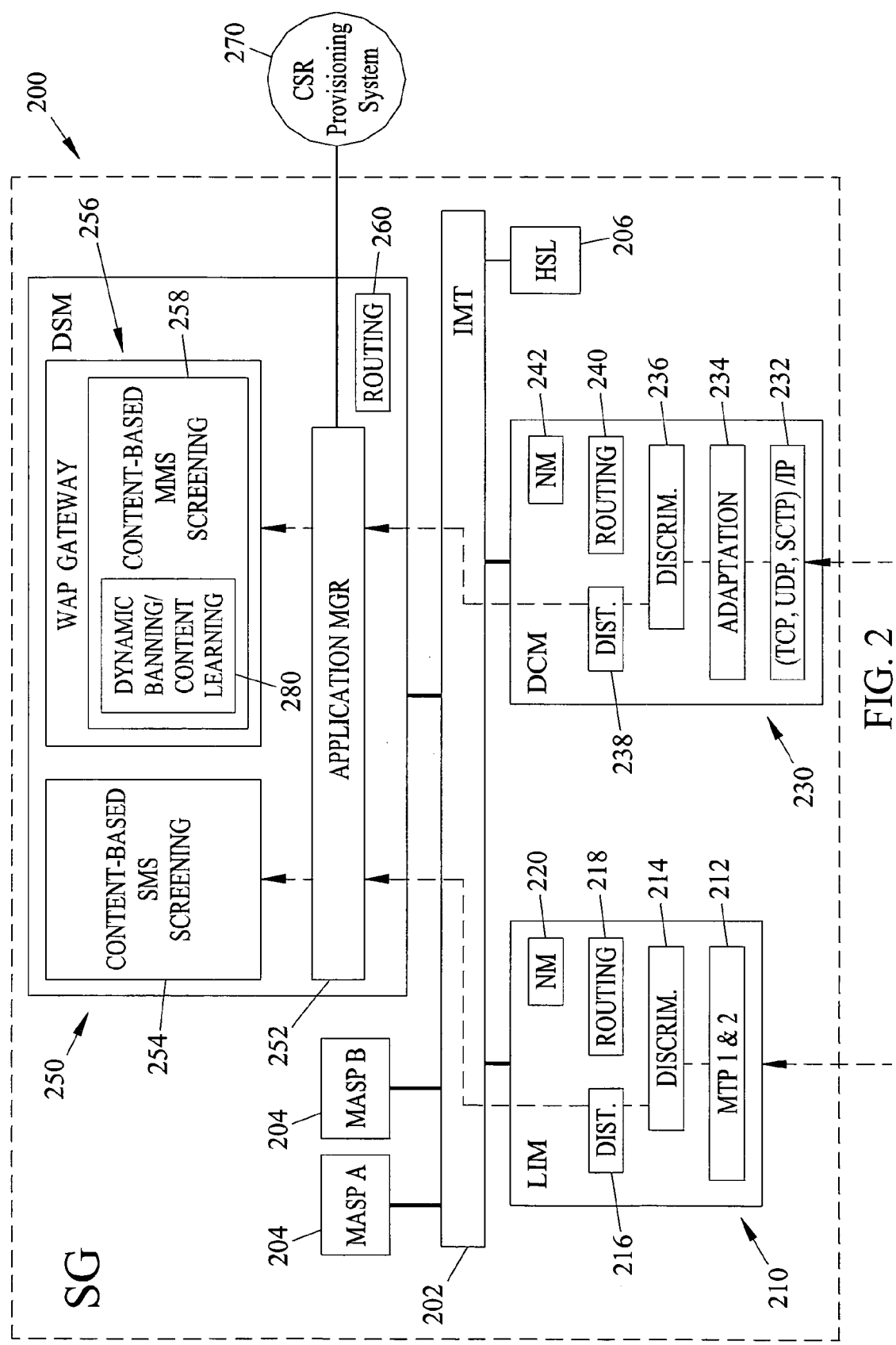
FIG. 2 is a system block diagram illustrating an SG routing node including an integrated database services module for performing content-based screening of messaging service (MS) messages according to an embodiment of the subject matter described herein.

FIG. 2 is a block diagram illustrating an exemplary internal architecture for an SG routing node 200 according to an embodiment of the subject matter described herein. Referring to FIG. 2, SG routing node 200 includes a high-speed IMT communications bus 202. A number of distributed processing modules or cards are coupled to IMT bus 202 including: a pair of maintenance and administration subsystem processors (MASPs) 204, an HSL communication module 206 that communicates with adjacent network elements via an ATM interface, an SS7 LIM 210 for communicating with SS7 signaling points via message transfer part (MTP)-based signaling links, a DCM 230 for communicating with nodes in an IP network via IP-based signaling links (e.g., transmission control protocol, user datagram protocol, stream control transmission protocol, etc.), and a DSM module 350 for hosting a content-based MS screening application of the subject matter described herein. While only one of each type of processing module is depicted in FIG. 2, it will be appreciated that an SG routing node may be simultaneously configured with multiple modules of each type, thereby providing a high degree of scalability and overall system reliability.

From a hardware perspective, LIM and DCM modules 210 and 230 may each include a printed circuit board physically connected to IMT bus 202. Each printed circuit board may include a communication processor programmed to send and receive messages via IMT bus 202. Each printed circuit board may also include an application processor programmed to perform various functions. For example, the application processor of LIM 210 may be programmed to perform the functions described herein for providing gateway screening, message discrimination, signaling network management, message transfer part (MTP) routing, and other signaling message processing functions.

SS7 LIM Module

In FIG. 2, LIM 210 includes an SS7 message transfer part (MTP) level 1 and 2 function 212, a discrimination function 214, a distribution function 216, an MTP routing function 218, and a network management function 220. MTP level 1 and 2 function 212 provides the facilities necessary to send and receive digital data over a particular physical medium, such as a DS0 communication link or an optical communication link (e.g., an OC-n signaling link). MTP level 1 and 2 function 212 may also perform error detection, error correction, and sequencing of SS7 message packets. Discrimination function 214 receives signaling messages from the lower MTP processing layers and performs a discrimination function, effectively determining whether an incoming message packet requires internal processing or is simply to be through-switched.

In one embodiment of the subject matter described herein, SMS messages received at SG 200 may be addressed to a network address associated with SG 200. In this case, discrimination function 214 may first examine a service indicator (SI) parameter in a received SS7 signaling message to determine if the message is an SCCP message. An SI parameter value of 3 is typically used in the SS7 protocol to indicate an SCCP message. If it is determined that a received signaling message is an SCCP message, then discrimination function 214 may examine destination point code (DPC) and subsystem (SSN) parameters in a received SS7 signaling connection control part (SCCP) message in order to determine whether the message is destined for a subsystem associated with the SG 200. If so, discrimination function 214 may further determine whether the SCCP message includes a mobile application part (MAP) component. For example, an SCCP SSN parameter value of 5 may indicate that the message contains MAP information.

If it is determined that the message includes a MAP component, function 214 may examine a MAP opcode value contained in the message to determine whether the message is a MAP FORWARD-SHORT-MESSAGE message, which is the MAP message used in GSM networks to transport short message content. If the message is determined to be a MAP FORWARD-SHORT-MESSAGE message, then discrimination function 214 may pass the message to distribution function 216. Distribution function 216 may receive the MAP FORWARD-SHORT-MESSAGE message and direct the message to an available DSM module that is provisioned to provide content-based MS screening processing, such as DSM module 250. It will be appreciated that some or all of the message parameters described in the example above may be used to determine whether content-based MS screening is required for a received message. Furthermore, with regard to SS7 SCCP messages, additional message parameters such as originating point code (OPC), routing indicator (RI), global title indicator (GTI), translation type (TT), nature of address indicator (NAI), numbering plan (NP), and network domain (e.g., ANSI, ITU, etc.) indicators also be used to determine whether content-based MS screening service is required for a received message.

In an alternate embodiment, SMS messages received at SG 200 are not addressed to a network address associated with SG 200. In this case, discrimination function 214 may intercept all SCCP signaling messages that are received by SG 200 and determine whether content-based MS screening service is required, regardless of the DPC/SSN address of a received SCCP message. The determination of whether content-based MS screening service is required may be performed in a manner similar to that described above, through examination of various signaling message parameters.

In an alternate implementation, the above-described MAP-level discrimination may be performed on a DSM module, and, as such, all SCCP messages are passed directly from the inbound LIM to a suitably provisioned DSM. Those SCCP messages that do not require content-based MS screening on the DSM module are re-distributed or routed from the DSM to the appropriate system module.

With regard to received messages that do not require further processing by an internal or adjunct processing subsystem, routing function 218 may MTP route these messages. That is, routing function 218 determines to which LIM, DCM, or HSL module a received SS7 message packet should be routed for subsequent transmission from the SG node. NM function 220 may provide SS7 network management support on behalf of all SS7 signaling links that terminate on LIM 210. As such NM function 320 may share status information with routing function 218 so that MTP routing rule data may be maintained with the most current view of routing system and network status possible.

IP DCM Module

DCM 230, shown in FIG. 2, includes an Internet protocol (IP) lower level protocol process 232, which may support a number of transport layer protocols including transmission control protocol (TCP), user datagram protocol (UDP), and stream control transmission protocol (SCTP). A signaling protocol adaptation function 234 provides the protocol encapsulation/translation functionality necessary to communicate signaling messages between networks that use different signaling protocol suites. For example, function 234 may convert Internet Engineering Task Force (IETF) SIGTRAN SCCP user adaptation layer (SUA)/SCTP protocol signaling messages to SS7/MTP SCCP protocol signaling messages and vice versa. Other protocol adaptation examples that may be supported by function 234 include SS7-to-session initiation protocol (SIP), SS7-to-H.323, SIGTRAN-to-SIP, SIGTRAN-to-H.323, and SS7-to-Transport Adaptation Layer Interface (TALI). In any event, adaptation function 234 may be used to process either inbound or outbound signaling messages.

Discrimination function 236 may include functionality that is analogous to the LIM-based discrimination function 214, described above. That is, discrimination function 236 may determine whether a received message should be allowed into the system (i.e., gateway screening) and also whether a received message requires additional processing (e.g., GTT, number portability translation, content-based MS screening, etc.) or is simply to be through-switched (i.e., routed). Discrimination function 236 differs from the previously described LIM-based discrimination function in that function 236 may provide discrimination service for messages associated with a wide variety of signaling and data communication protocols including SS7, SIP, IETF SIGTRAN SUA, M3UA, M2PA, H.323, WAP/WSP/WDP, HTTP. While the protocols of the messages may vary, the basic functionality of discrimination function 236 remains constant, and that functionality includes identifying those received messages that require or are likely to require content-based MS screening service.

For example, in the case of a received IETF SIGTRAN SUA signaling message that includes a MAP FORWARD-SHORT-MESSAGE component, discrimination processing proceeds in a manner similar to that described above with respect to a received SS7 SCCP-based MAP FORWARD-SHORT-MESSAGE. Decoded message parameters examined during discrimination processing may include DPC, OPC, SI, RI, GTI, TT, NAI, NP, and network domain.

In the case of a received WAP message that includes multimedia content, such as a WAP message that contains an M-SEND.REQ component, destination network address information contained in the message, such as a destination IP host and port information, may be examined. Originating network address information may be examined in a similar manner. An X-MMS-MESSAGE-TYPE parameter within the MMSE encoded M-SEND.REQ protocol data unit may be examined to determine whether the value is equal to "m-send-req". These discrimination parameters are exemplary, and other message parameters may be used to determine whether content-based MS screening service is required for a received WAP message.

In any event, a received message is determined to be of a type that requires or may likely require content-based MS screening, then discrimination function 236 may pass the message to distribution function 238. Distribution function 238 may receive the candidate message and direct the message to an available DSM module that is provisioned to provide content-based MS screening processing, such as DSM module 250.

With regard to received messages that do not require further processing by an internal or adjunct processing subsystem, routing function 240 is adapted to route these messages. That is, routing function 240 determines to which LIM, DCM, or HSL module a received message packet should be routed for subsequent transmission from the SG node. NM function 242 may provide network management support on behalf of communication links that terminate on DCM 230. As such, NM function 242 may share status information with routing function 240 so that routing rule data may be maintained with the most current view of routing system and network status possible.

Content-Based MS Screening Application and Host DSM Module

In FIG. 2, DSM module 250 hosts an exemplary content-based MS screening application according to an embodiment of the subject matter described herein. DSM 250 includes an application manager 252, a content-based SMS screening function 254, a WAP gateway function 256 that includes a content-based MMS screening function 258, and a routing function 260. Application manager 252 may receive messages from other modules in the system (e.g., LIM, DCM, HSL, etc.) that have been identified at least as potential candidates for content-based MS screening service. In one embodiment, application manager 252 examines a received candidate message and determines whether the message contains an SMS message or a MMS message. If the message contains an SMS message, then the message is directed to content-based SMS screening function 254. If the message contains a MMS message, then the message is directed to WAP gateway 256 for subsequent processing by content-based MMS screening function 258. Application manager 252 may also provide an interface for communicating with an external content-based screening rule (CSR) provisioning system 270. User specified content screening rules are received from provisioning system 270 and subsequently administered by manager 252. That is, in addition to providing the necessary security services (e.g., firewall, encrypt/decrypt, authentication, verification, etc.) for communications with provisioning system 270, application manager 252 may also direct received screening rule data to the appropriate screening function. For example, received SMS screening rules are directed to content-based SMS screening function 254, while received MMS screening rules are directed to content-based MMS screening function 258.

In an alternate implementation, content-based SMS and MMS screening applications could be combined into a single content-based MS screening application, in which case all received messages and screening rule updates would be directed to the single screening application. According to yet another embodiment of the subject matter described herein, provisioning system 270 can be incorporated within 200 and may reside on DSM 250. As such, direct provisioning of screening rule data on DSM 250 may be accomplished by end users/subscribers. In this case, application manager 202 may host a web-accessible CSR provisioning application, whereby end users/subscribers can log in and administer their own content screening rules.

In manner similar to that described above with respect to LIM 210 and DCM 230, routing function 260 may receive a message from one of the MS content screening applications and determine, based on routing address information contained in the message, to which LIM, DCM, or HSL module the message packet should be routed for subsequent transmission from SG node 200.

Content-Based SMS Screening

Content-based SMS screening function 254 may receive an SMS message, such as a MAP FORWARD-SHORT-MESSAGE or an SMPP-based SMS message, and apply one or more content screening rules to the SMS content carried within the message. If the message fails the content-based screening, then the SMS message may be discarded (i.e., screening action=Blocked). A new message may also be generated and sent back to the originator of the blocked SMS message, notifying the sender that the SMS message was not delivered (i.e., screening action=Block & Notify). A message may also be generated which notifies a policing authority, such as the Federal Communications Commission or other federal, state and local authorities that are charged with administering anti-spain/personal privacy policies related to MS messaging. Messages that pass content-based screening may undergo additional processing (e.g., GTT) in SG 200 or may be routed on to or towards their muting destination. Table 1 shown below illustrates exemplary content-based screening rules that may be implemented by content-based SMS screening function 254.

TABLE 1

Exemplary SMS Content Screening Rule Data

| Msg Recipient | Msg Originator | Content | Screening Action |
|---|---|---|---|
| 9194605500 | * | "Sale" | Block |
| 9194605500 | * | "Viagra" | Block |
| 9193803812 | 2122139898 | "Scores" | Block & Notify |
| 9193454014 | sales@home.com | "Townhome" | Block |
| 9194691588 | * | Like "Viagra" | Block |
| 9194691588 | sales@sears.com | "Special Offer" | Allow |

Table 1 illustrates SMS content screening rules that may be defined by or for an end user. In Table 1, each screening rule includes a message recipient identifier, a message originator identifier, a content screening parameter, and a screening action indicator. Message recipient identifiers may include a wireline telephone number, a wireless subscriber telephone number (e.g., mobile subscriber ISDN number, mobile identification number), a wireless terminal identification number (e.g., international mobile station identifier), an IP Universal Resource Locator (URL), and an electronic mail address. In one embodiment of the subject matter described herein, each message recipient is able to specify his or her own content screening rules via a web- or Internet-accessible user interface. Alternatively, or in addition, network operators may define lists of allowed or prohibited text or screening rules, and recipients may opt in or opt out, depending on the preferred mode of filter definition. Message originator identifiers included in spam filters may include the same types of identifiers described above with respect to message recipients. A global or wildcard identifier (e.g., "*") may be specified as a message originator identifier to indicate all or any message originators.

Content screening values may be specified as exact ASCII text words or phrases, as for example, the content screening value "Viagra." Content screening values may also be specified in terms of close spelling matches (e.g., "Viagr1"), homonyms, heteronyms, or other similar words using the keyword operator "Like". In one embodiment, users may specify a "strictness of match" attribute (e.g., high, medium, low) to be used in conjunction with a "Like" operator, such that a higher strictness of match requires a closer match than a low strictness of match. Wildcard operators may also be used in the specification of content screening values.

By specifying a content screening rule that includes an "Allow" screening action, a user may define a white list for certain words or phrases so that messages containing the user-specified content will be passed or allowed. Using the example shown in Table 1, a user associated with the telephone number (919) 469-1588 has defined a content screening rule, which specifies that all SMS messages sent by sales@sears.com that contain the phrase "Special Offer" should pass screening and be delivered. This screening rule also implies that SMS messages containing the phrase "Special Offer" received from any other sender should be blocked.

In another embodiment, users may select groups of screening content values by choosing from pre-defined classes of content screening values. For example, a content screening class associated with "Sex/Porn" may be pre-defined by a network operator. Such a content screening class may include a list of words or phrases commonly associated with sex/porn related content. A user may select the "Sex/Porn" class, and by doing so, the screening rules for the user may inherit all of the pre-defined words and phrases that are associated with that class. A general default class may be defined by a network operator in a manner similar to that described above, which includes a set of generally offensive words or phrases (e.g., obscenities).

Content-Based MMS Screening

In a manner that is generally similar to that described previously with respect to SMS messages, content-based MMS screening function 258 is adapted to receive a MMS message, such as a WAP M-SEND.REQ message, and apply one or more content screening rules to the MMS content carried within the message. If the message fails the content-based screening, then the MMS message may be discarded. A new message may also be generated and sent back to the originator of the blocked MMS message, notifying the sender that the MMS message was not delivered. A message may also be generated which notifies a policing authority, such as the Federal Communications Commission or other federal, state and local authorities that are charged with administering anti-spam/personal privacy policies related to MS messaging. Messages that pass content-based screening may undergo additional processing (e.g., WAP-to-HTTP conversion via WAP gateway 256) in SG 200 or may be routed to their routing destinations. Table 2 shown below illustrates exemplary content-based MMS screening rules that may be used by content-based MMS screening function 258.

TABLE 2

Exemplary MMS Content Screening Rule Data

| Msg Recipient | Msg Originator | Screen Rule Type | Screen Rule | Screen Action | Redirect To |
|---|---|---|---|---|---|
| 9194605500 | * | Text | "Viagra" | Block | N/a |
| 9194605500 | * | Size | >1 MB | Block | N/a |
| 9193803812 | 2122139898 | Format | MPEG | Redirect | m@aol.com |
| 9193454014 | dad@aol.com | Format | WAV | Allow | N/a |
| 9193454014 | * | Hyper | URLx | Block | N/a |

The rules illustrated in Table 2 may be defined by or on behalf of an end user. In the illustrated example, each rule may include a message recipient identifier, a message originator identifier, a content screening parameter, and a screening action indicator. Message recipient identifiers may include a wireline telephone number, a wireless subscriber telephone number (e.g., mobile subscriber ISDN number, mobile identification number), a wireless terminal identification number (e.g., international mobile station identifier), and an electronic mail address. In one embodiment of the subject matter described herein, each message recipient is able to specify their own content screening rules via a web- or Internet-accessible user interface. Alternatively, or in addition, network operators may define lists of allowed or prohibited text or screening rules, and recipients may opt in or opt out, depending on the preferred mode of filter definition. Message originator identifiers included in spam filters may include those same types of identifiers described above with respect to message recipients. A global or wildcard identifier (e.g., "*") may be specified as a message originator identifier to indicate all or any message originators. In the case of a WAP M-SEND.REQ message, message recipient information may be determined by examining "To", "CC", or "BCC" parameters contained in the message. Likewise, message originator information may be determined by examining a "From" parameter contained in the message.

The exemplary screening rule data presented in Table 2 includes a screening rule type identifier, a screening rule value, a screening rule action, and a redirect destination. Because multimedia messages, by definition, may carry several different types of media (e.g., text, video, images, audio), a screening rule type identifier enables a user to specify to which type of media or media attribute a particular screening criteria is to be applied. Exemplary MMS screening rule types shown in Table 2 include text, hyperlink, data size, and data format. The screening rule parameter is used to specify a screening rule value associated with a given screening rule type. For example, a screening rule type "Format" may have an associated screening rule value of "MPEG" to specify only MPEG formatted video data, or "VIDEO" to specify all video data formats. The content type of a message may be determined, at least in part, from a "Content-Type" parameter contained in a WAP M-SEND.REQ message. Further decode of the message content payload may be required to determine complete content property information. At the time of this disclosure, well-known WAP Content-Type values are maintained by the WAP Forum, and a complete listing may be found at http://www.wapforum.org/wina/wsp-content-type.htm.

A screening action indicates how to process a MMS message that satisfies the associated screening criteria. Exemplary screening action values include, but are not limited to, Block, Block & Notify, Allow, and Redirect. Block, Block & Notify, and Allow provide functionality similar to that previously described with respect to SMS screening. The Redirect screening action enables a user to specify an alternate destination to which a screened message should be delivered. For example, a user may wish to have all MMS messages larger than 1 megabyte (MB) redirected to an email account. In such a case, the user may specify the redirect destination (i.e., their email address) in the associated Redirect To field.

With regard to the screening rule type "Hyper" or hyperlink, it will be appreciated that the ability to block MMS messages containing hyperlinks to offensive sites (e.g., pornographic sites) may be particularly useful for parents wishing to block such messages from being sent to the phones/MMS terminals of their children. Using the present invention, parents may specify a list of WEB site URLs, which are to be blocked regardless of whether the URL contains any offensive, pornographic, or otherwise suggestive text.

MMS screening rules used by content-based MMS screening function 254 may be specified using any number and combination of message content attributes. Those illustrated in Table 2 are merely illustrative of the basic MMS screening concepts associated with one embodiment of the present invention. Network operator defined classes or default lists of MMS message-blocking criteria may be employed in a manner similar to that previously described with respect to content-based SMS screening.

Finally, with respect to the exemplary embodiment illustrated in FIG. 2, received WAP messages that pass content-based MMS screening are subsequently processed by WAP gateway function 256 prior to routing from SG 200. WAP gateway function 256 may reformat or translate a WAP MMS message into a web protocol message, such as an HTTP-based MMS message, which can be communicated to an MMS relay/server. Such WAP gateway functionality is well known in the industry, and is generally described in *Wireless Application Protocol Architecture Specification WAP*-210-WAPArch-20010712, published by the WAP Forum, the disclosure of which is incorporated herein by reference in its entirety. It will be appreciated, however, that WAP gateway functionality is not required to provide the content-based MS screening service contemplated by the present invention.

Content-Based MS Screening Service Location

Described herein are embodiments of a content-based screening system that may reside in a network routing node, such as an SS7 STP or SS7/IP signaling gateway. In one exemplary implementation, content-based MS screening is performed on an MS message prior to the MS message reaching store-and-forward resources in an operator's network. With respect to SMS service, store-and-forward resources include SMSC nodes, while MMS service store-and-forward resources include MMS relay/server nodes. In the case of MMS messaging, performing content-based screening may be performed on an MMS message prior to processing at a WAP gateway. In this way, valuable network resources are effectively "shielded" from expending processing effort on unwanted MS messages.

In an alternate implementation of the subject matter described herein, content-based MS screening functionality may be integrated or co-located with a store-and-forward node, such as an SMSC or MMS relay/server. While screening prior to store-and-forward processing is preferable, in alternate embodiments, MS content-based screening may be deployed at points downstream from store-and-forward nodes. For example, a user may define content-based screening rules, which are stored on their MS terminal (e.g., phone, wireless PDA, etc.). As such, content-based screening functionality may be deployed directly on user terminals, as opposed to the core network embodiments described in detail herein. In the case of such a network edge-based screening solution, each MS terminal need store subscriber-defined content screening rules, carrier-specific screening rules, etc. Application of the content-based screening rules in this case is similar to that previously described herein with respect to an SG-based implementation.

Figure 3:
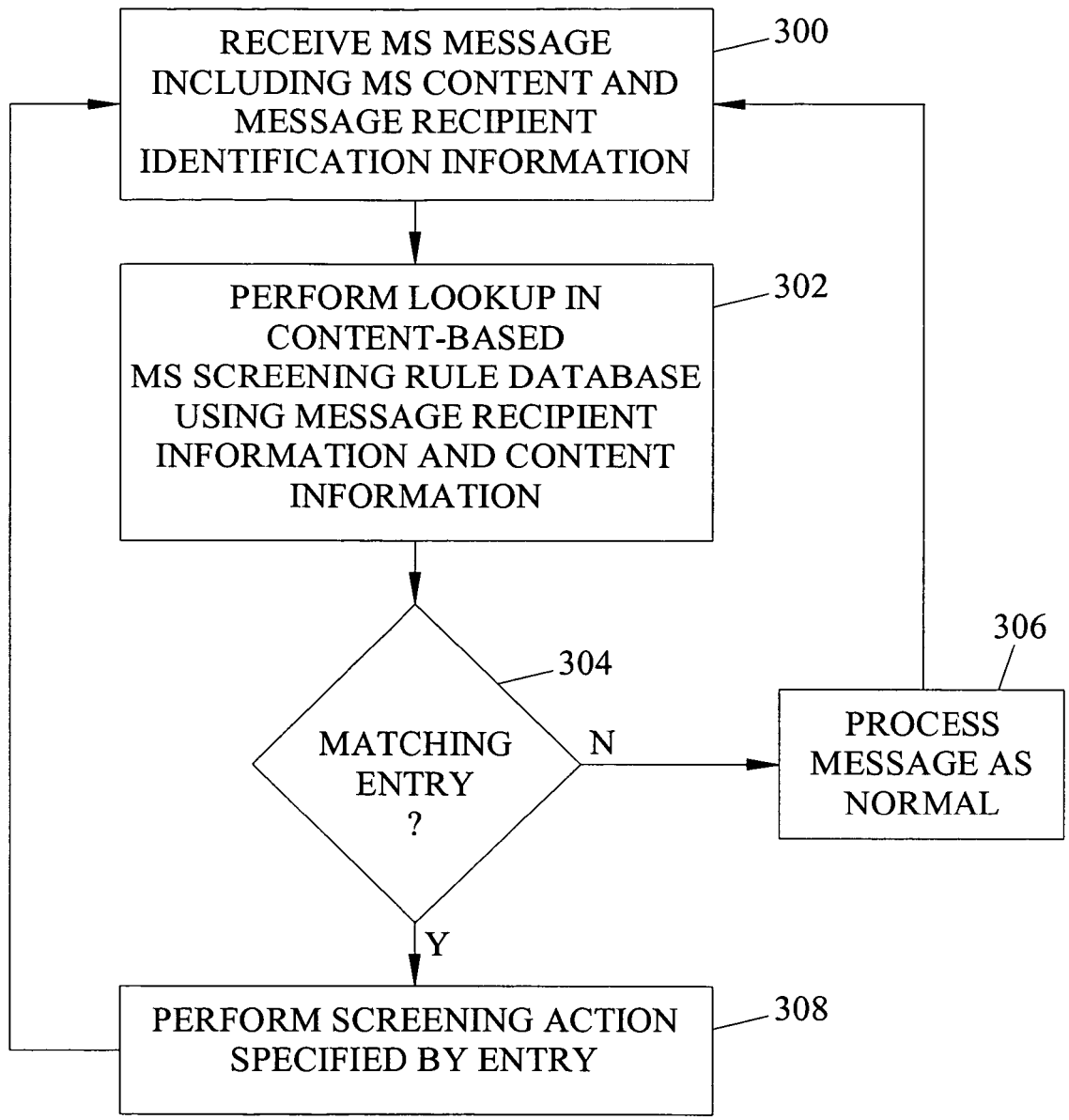
FIG. 3 is a flow chart illustrating exemplary steps for content-based message service screening according to an embodiment of the subject matter described herein.

FIG. 3 is a flow chart illustrating exemplary steps for performing content-based MS screening according to an embodiment of the subject matter described herein. Referring to FIG. 3, in step 300, MS messages including MS content and message recipient information is received. The message may be received at a communication module of a routing node, such as routing node 200 illustrated in FIG. 2. In step 302, a lookup is performed in a content-based MS screening rule database using the message recipient information and the content information. The MS screening rule database may include data similar to that illustrated above in Tables 1 or 2. In step 304, it is determined whether a matching entry has been located. If a matching entry has not been located, control proceeds to step 306 where the message is processed as normal. Processing the message as normal may include routing the message to its intended destination.

In step 304, if a matching entry is located, control proceeds to step 308 where a screening action specified in the entry is performed. Examples of screening actions may include discarding the message, allowing the message, discarding the message and sending a notification message to the sender, discarding the message and sending a notification message to an enforcement authority, etc.

MS Content Screening Rule Provisioning

Figure 4:
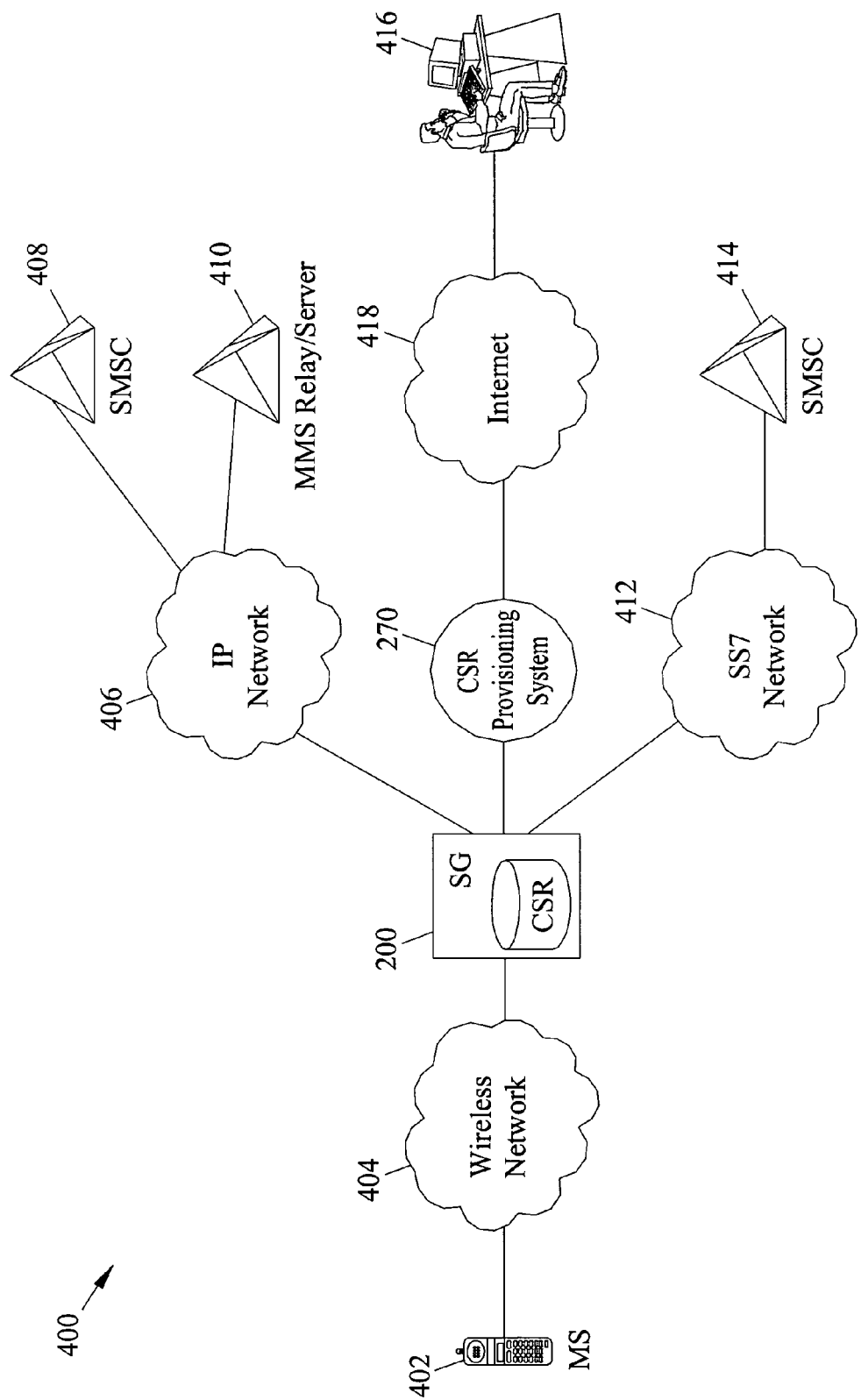
FIG. 4 is a network diagram illustrating an SG routing node for providing content-based messaging service screening and an associated web-based content screening rule provisioning system according to an embodiment of the subject matter described herein.

One aspect of providing content-based MS screening according to the subject matter described herein includes provisioning the screening rules used by the screening application. In one implementation, individual MS service subscribers may easily specify and administer their own content screening rules. FIG. 4 illustrates or system for allowing subscribers to provision content-based MS screening rules according to an embodiment of the subject matter described herein. In the exemplary embodiment illustrated in FIG. 4, a network environment 400 includes a wireless phone 402 that is adapted to send and receive MS messages, an associated wireless communication network 404 (e.g., GSM, ANSI IS-41, etc.), an IP network 406, which includes an SMSC 408 and a MMS relay/server 410, an SS7 network 412 that includes an SMSC 414, a web user 416 that is connected to a content-based MS screening provisioning application 270 via the public Internet 418. Provisioning application 270 is connected to SG 300, as previously discussed and illustrated in FIG. 2. In this example, if it is assumed that web user 416 is also the user of wireless MS terminal 402, then web user 416 is adapted to log in to a secure web site, which hosts a MS content screening rule administration application. As such, web user 416 is capable of defining one or more content screening rules, as previously described herein. User-defined screening rules are periodically downloaded to the content-based MS screening application on SG 200. It will be appreciated that provisioning system 270 may service multiple SG nodes (or other nodes) that are equipped with content-based MS screening applications. Also, with regard to an embodiment of the present invention that involves providing content-based screening functionality in end user terminals, provisioning system 270 may communicate directly with end user terminals to periodically update content screening rule data.

Dynamic Banning and Content Learning

In addition to the user-provisioned content-based MS screening described above, the subject matter described herein may also include dynamically banning MS messages in response to the user forwarding the messages to a banning/content learning application where MS message screening rules are dynamically created based on message content. According to dynamic banning, when a user receives an unwanted message, the user may forward the message to a banning/content learning application. The banning/content learning application may reside on a gateway, such as signaling gateway 200 illustrated in FIG. 2, on an SMSC, on a stand-alone server, or on any other node capable of delivering or forwarding MS content to a user. In FIG. 2, signaling gateway 200 includes a dynamic banning/content learning module 280 for receiving offending messages from a recipient and automatically populating an associated MS screening database with sender information from the received messages. The entries added to the database may be similar to those illustrated above in Tables 1 or 2. Messages may then be screened based on their content, as described above.

In addition to automatically adding screening rules from banned messages to the MS content screening database, dynamic banning/content learning module 280 may dynamically learn new screening rules based on the content of banned or allowed messages and add the new content-based screening rules to the MS screening database. Content learning goes a step beyond dynamic banning. When a user receives an unwanted message and sends it to dynamic banning/content learning module 280, module 280 may build an artificial intelligence profile of unwanted messages looking for similarities in words or groups of words. Dynamic banning/content learning module 280 may create a new screening rule or rules based on the content from the banned messages. The new rules may become increasingly detailed as the database of offensive messages increases. The newly created screening rules may be applied to incoming messages, thereby screening more potentially offensive messages. The user may indicate whether the messages screened should be discarded or diverted to another mailbox. Thus, automatically generating content-based MS screening rules is intended to be within the scope of the subject matter described herein.

In one exemplary implementation, dynamic banning/content learning module 280 may employ Bayesian statistical analysis to 'learn' sets of words and phrases that appear in spam. This approach analyzes known spam and known non-spam messages, identifying tokens that appear frequently in spam and infrequently in non-spam. Tokens are assigned weighting factors based on their statistical appearance. New SMS messages are analyzed and assigned a composite score based on the appearance and distribution of spam words. The decision to permit the message to be delivered or to block it is then made based on rules related to the composite score. The advantage of this more sophisticated approach is that it reduces the instances of false positives. For example, if you block an SMS message simply because it contained word "Viagra," it could have been a legitimate message from your pharmacy. If, on the other hand, the word 'Viagra' appeared in the message in conjunction with other spam-related words, such as "special offer," "free," and "buy now," the total score for that message would be quite high, indicating that it was highly likely to be spam as opposed to an innocuous message.

Thus, the dynamic generation of content-based screening rules performed by dynamic banning/content learning module 280 may be based on combinations of MS content elements or tokens, e.g., words, groups of words, audio clips, video clips, etc., that have been identified as objectionable or allowed. Based on the combination, dynamic banning/content learning module 280 may learn at least one new rule to be applied to future messages.

MS Screening Based on SMPP Content Type

According to another aspect of the subject matter described herein, it may be desirable to screen MMS messages based on content type. For example, there is currently a proposal to amend the SMPP standards to force applications that send MMS messages to include a content classification indicator in the message parameters. The content classification indicator is used to identify types of content, such as porn or advertising. If this proposal becomes reality, content-based MMS screening application 258 illustrated in FIG. 2 may analyze MMS messages to determine the content type. One exemplary screening rule that may be performed based on the content classification type may be to refuse any MMS messages that fail to include the content classification type. Such a screening rule would apply to MMS that is generated by an application using SMPP, such as a machine application. However, since most annoying spam comes from machine applications, this rule is likely to be effective. Another exemplary screening criteria that may be designed based on the content classification type is to exclude a content classification type that is offensive to a user, such as porn.

Additional Spam Identification Methods

In addition to the methods described above for identifying spam MS messages, any of the methods described in commonly-assigned, co-pending U.S. patent application Ser. No. 09/908,753, the disclosure of which is incorporated herein by reference in its entirety, and/or in commonly-assigned U.S. Pat. No. 6,819,932, can be used in combination with the methods described herein to identify and screen spam SMS messages. The above-identified patent application discloses methods for preventing SMS flooding. For example, as described in the patent application, the number of messages from a particular source and/or to a particular destination per unit time may be counted and compared to a spam threshold. If the threshold is exceeded, the messages may be identified as spam. The above-identified patent describes methods for screening unwanted SMS messages based on a database of screening parameters, such as originating party identification information.

Any of the methods described in the above-referenced patent application and patent may be used in combination with content-based SMS screening, as described herein. For example, an exemplary SMS screening method according to the subject matter described herein may include blocking or allowing messages from a particular originator that have content that is prohibited or allowed by the recipient. The originator may be identified based on a list of know spam sources obtained from a third party source or based on a source that is dynamically identified using the methods described above. Exemplary third party sources that sell spam lists include SPAMhaus, SPEWs, Blackholes, SORBS, NJABL, MAPS RBL, etc. Blocking messages from a particular message originator in a blacklist defined by a network operator may be a first step in a combined spam MS screening method according to an embodiment of the subject matter described herein. If a message passes network-level MS origination screening, it may be blocked because it contains content that has been defined as unwanted by a recipient. Alternatively, if a message fails network-level origination screening, the message may pass a particular user's content-based screening, if the user defines a rule allowing all messages that have particular user-defined content.

A screening method that combines MS message flood control with content-based screening may include counting the number of messages from a particular source that have particular content and either blocking or allowing the messages. One particular number-based rule that a user may desire to define is to limit the number of messages from automated sources, such as SMPP sources. Any exemplary screening method based on whether a message is from an automated source may include counting the number of messages received from automated sources within a user-specified time period. The time period may be a sliding window, and any messages from automated sources that would cause the threshold to be violated within its time window will be discarded.

Since spammers often use methods to disguise spam messages, it is desirable to devise different methods for identifying spam. For example, spammers often use different source addresses for spam. One method for identifying spam MS messages when different source addresses are used includes the content-based screening methods described above, which do not rely on the source address to work. In another method, text from a message or group of messages may be analyzed and stored. Messages having the same or similar text for a predetermined time period may be counted. If the number of messages that have the same or similar content exceeds a user- or operator-defined threshold, the messages may be identified as spam. Another method for identifying spam content is keeping track of SMS attempts when dialed numbers are sequential. A group of SMS messages with sequential dialed numbers may indicate that an automated source is generating mobile phone numbers starting with a known good number within a carrier-designated block. Another method for identifying SMS messages may include counting the number of SMS messages with invalid destination numbers or addresses within a time period. If the number of SMS messages with invalid destination numbers detected within the time period exceeds a user- or operator-specified threshold, the messages may be identified as spam. Such a filter may detect SMS messages where the dialed number or address is generated by a random number generator.

Languages Other Than English

Although the examples described above include examples of English text that may be used to perform content-based screening of MS messages, the subject matter described herein is not limited to these examples. For example, a subscriber or a network operator may define content-based screening rules in any language in which it is desirable to filter spam content. Moreover, screening rules defined in one language may be automatically translated into multiple languages to form a more comprehensive spam filter set.

Alternate Architectures

In the architecture illustrated above in FIG. 2, content-based MS screening functionality is located in a signaling message routing node. This architecture may be advantageous because signaling message routing nodes may be located centrally in a carrier's network or at a gateway point into a carrier's network. As a result, the signaling message routing node and the content-based MS screening functionality will naturally encounter messages with MS content, i.e., without requiring that the MS messages be redirected to a specialize MS gateway or intermediate node. In an alternate implementation, the content-base MS screening functionality may be located at one or more MS gateways that are positioned in front of or at SMSCs. In such an implementation, the architecture for spam filtering may accommodate the deployment of multiple SMS gateways/SMSCs in geographically separate locations and must permit screening activities to occur with minimal processing resources.

Figure 5:
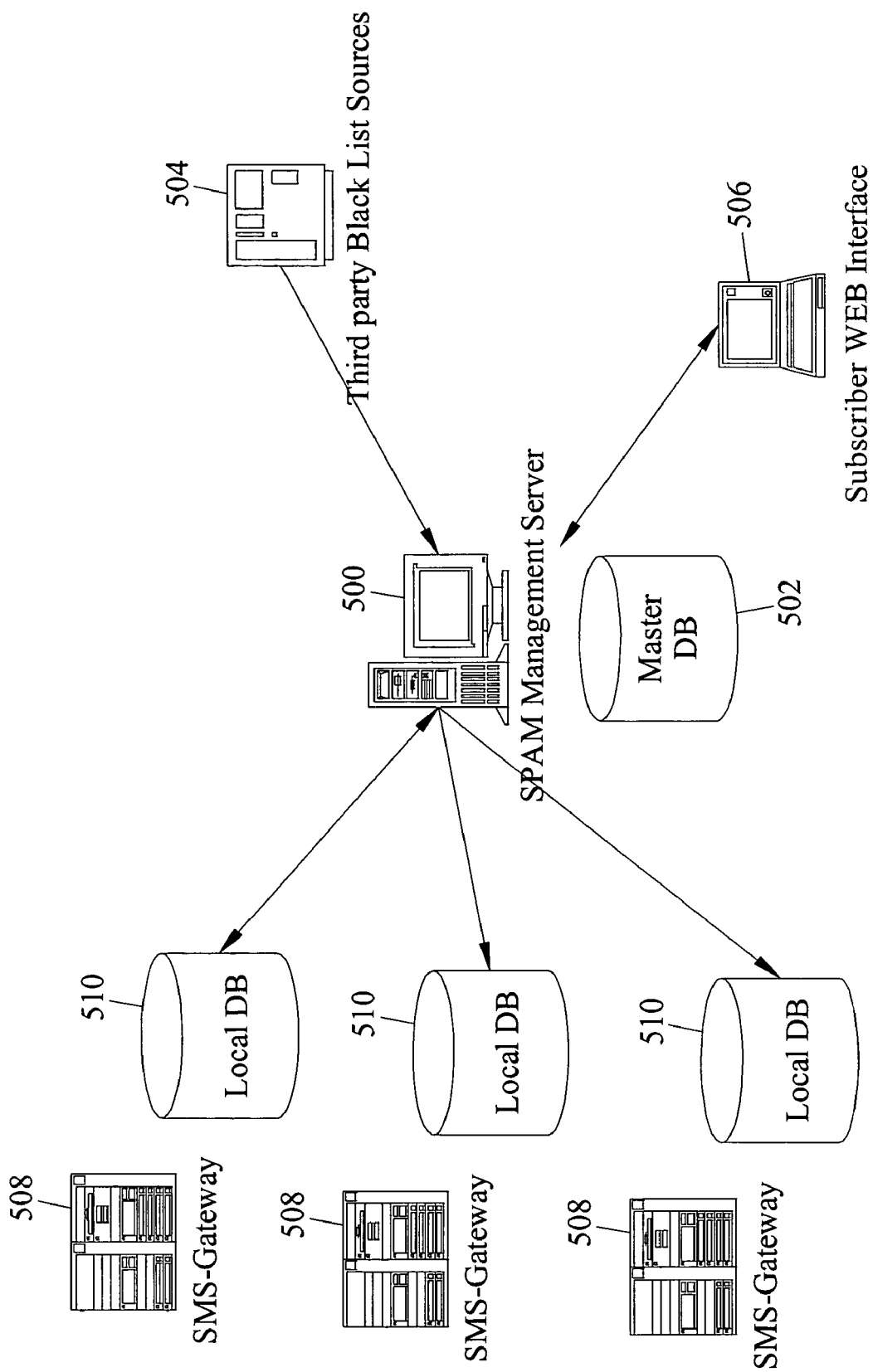
FIG. 5 is a network diagram illustrating an exemplary architecture for implementing SMS screening according to an alternate embodiment of the subject matter described herein.

In one exemplary implementation, content-based MS screening may be based on a series of logical (if not physical) databases that are centrally managed from a spam manager network element, as shown in FIG. 5.

In FIG. 5, a spam management server 500 maintains a master database 502 of black lists, system options, subscriber options, subscriber white lists, and system statistics. Third party black list sources 504 may provide lists of known spam sources for inclusion in master database 502. A web interface 504 may provide individual subscribers with a convenient way to manage individual black/white lists and to manage individual message content filter rules stored in master database 502.

Master database 502 may be logically divided into the following categories of data, such as:
a. System Options (determined by the Carrier)
b. Subscriber Options (determined by the individual subscribers)
c. Network originator blacklists (from $3^{rd}$ parties and/or entered manually by the carrier)
d. Subscriber black lists (manually entered by the subscriber via the web interface and/or automatically entered via a handset interface through the SMS gateway)
e. Subscriber white lists (manually entered by the subscriber via the web interface and/or automatically entered via a handset interface through the SMS gateway)
f. Network message content token lists
g. Subscriber message content token lists
h. Statistical data, such as total messages, messages blocked by reason, messages blocked by originator, etc. (from the individual SMS gateways)
i. Message arrival pattern violations (from the individual SMS gateways).

Master database 502 may distribute copies of its data to SMS gateways 508, which maintain copies of master database 502 as local databases 510. Spam management server 500 may be responsible for synchronizing provisioning changes from master database 502 to each of the local databases 510.

Each individual SMS gateway 510 may maintain its own, unique set of statistical data (item h) and message arrival pattern violation data (item i). The statistical data may be transferred to the spam management server 500 periodically so that it can be consolidated into master database 502 for reporting purposes. The frequency of the data transfer does not have to be very high and can be performed at hourly or even daily intervals.

The message arrival pattern violation data may be transferred to the spam management server 500 very quickly in order to minimize the window in which a spam attack is detected and stopped across all SMS Gateways.

Architectural Elements of Data

Spam filter databases 508 may include various types of black lists and white lists. Each of these types of lists will now be explained in detail.

Simple White Lists

Simple white lists are lists of allowed originators whose contents are managed by the individual subscribers from a web page. In this scenario, the subscriber views his current list contents in spam management server master database 502 and makes modifications. Spam management server 502 then synchronizes the modified subscriber white list contents to all of SMS gateway local databases 510 in real time or near-real-time.

Figure 6:
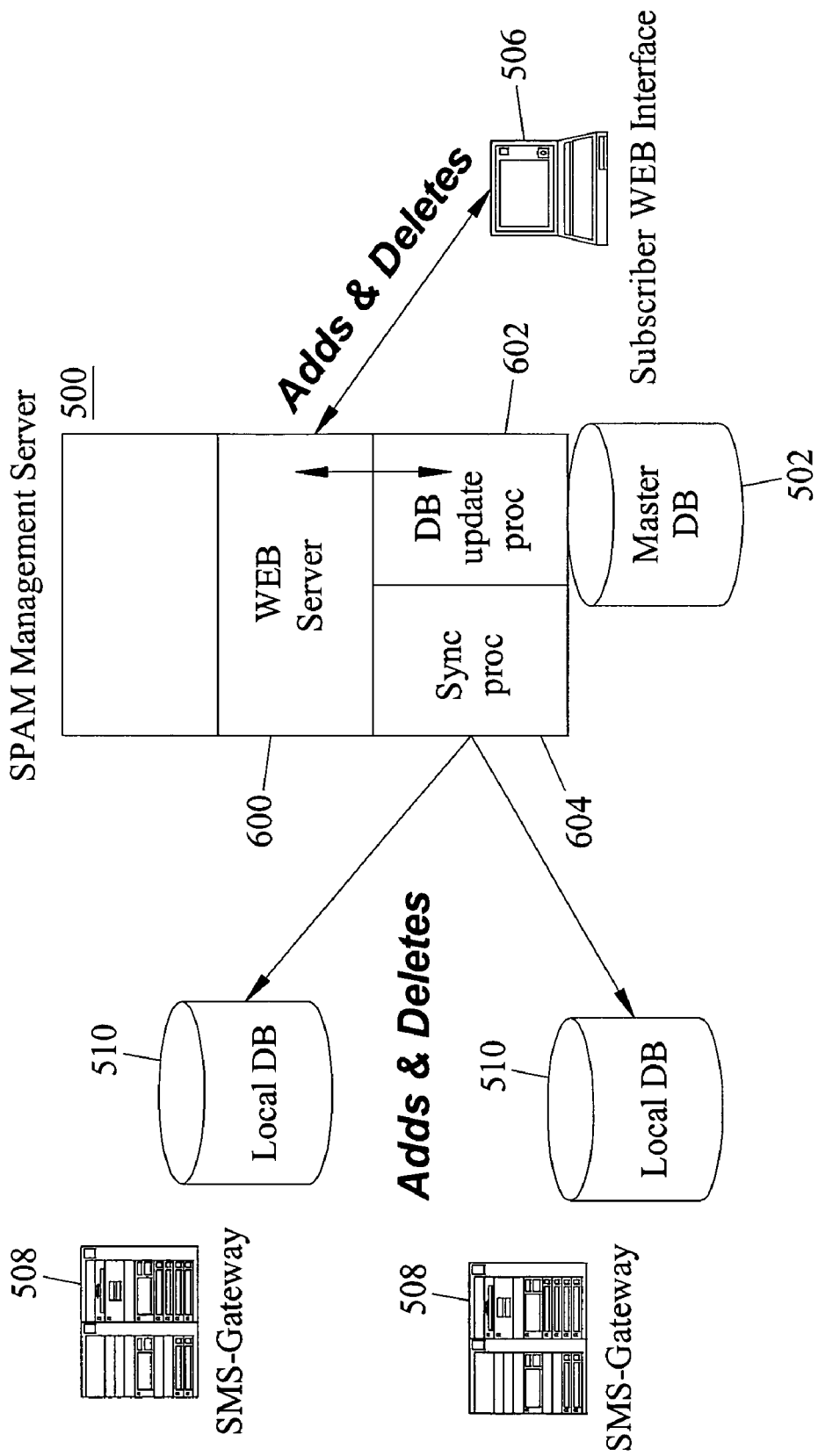
FIG. 6 is a network diagram illustrating a method for provisioning MS screening white lists in a plurality of geographically distributed SMS gateway according to an embodiment of the subject matter described herein.

FIG. 6 illustrates the provisioning of simple subscriber white lists in more detail. In FIG. 6, spam management server 500 includes a web server 600 for receiving white list adds and deletes from subscriber web interface 506. In addition, spam management server 500 includes a database update module or process 604 for updating master database 502 based on the adds or deletes received by web server 600. A sync process or module 604 ensures synchronization between master database 502 and local database 510.

Complex Subscriber White Lists

Complex white lists are lists of allowed originators whose contents are managed by a combination of manual web page access and SMS messaging. In this scenario, a mobile subscriber receives an MS message from a source and wants to dynamically add that sender to his subscriber white list. In one implementation, the subscriber may use an SMS short code of other similar mechanism to forward the message to the spam management server 500, which then adds the originator identification to the subscriber's white list and synchronizes the update to SMS gateways 508.

Figure 7:
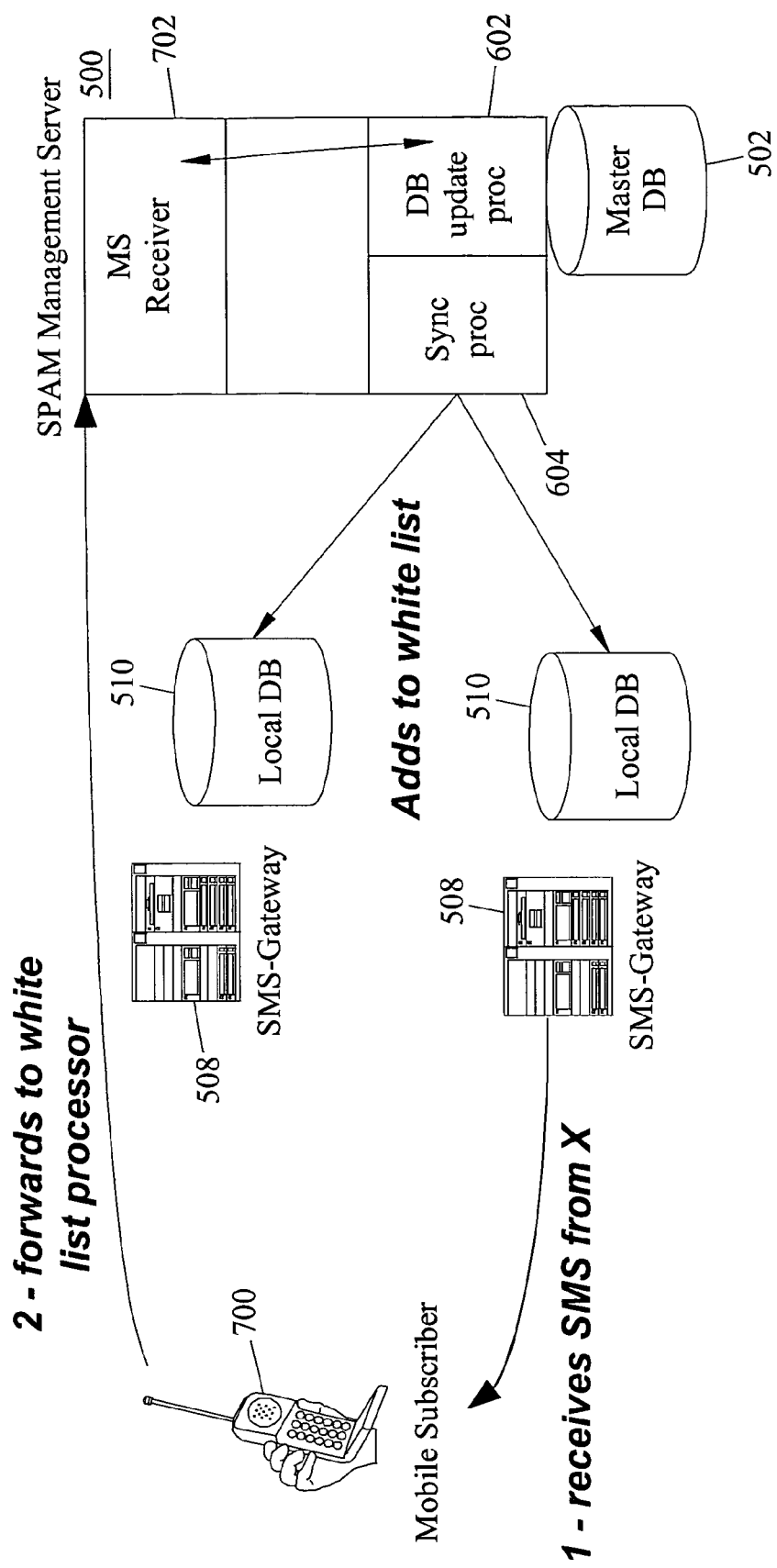
FIG. 7 is a network diagram illustrating a method for updating an MS screening white list based on an SMS message according to an embodiment of the subject matter described herein.

FIG. 7 illustrates the complex white list update procedure in more detail. Referring to FIG. 7, mobile subscriber 700 receives an MS message including unwanted content. In response, mobile subscriber 700 forwards the MS message to MS message receiver 702. MS message receiver 702 extracts originating party information from the message and passes the information to database update procedure 602. Database update procedure 602 updates master database 502. Sync process 604 automatically updates local database 510. Thus, as illustrated in FIG. 7, SMS screening databases in different locations can be automatically updated based on an SMS message sent to an SMS manager by a subscriber.

Third-Party Black Lists

Figure 8:
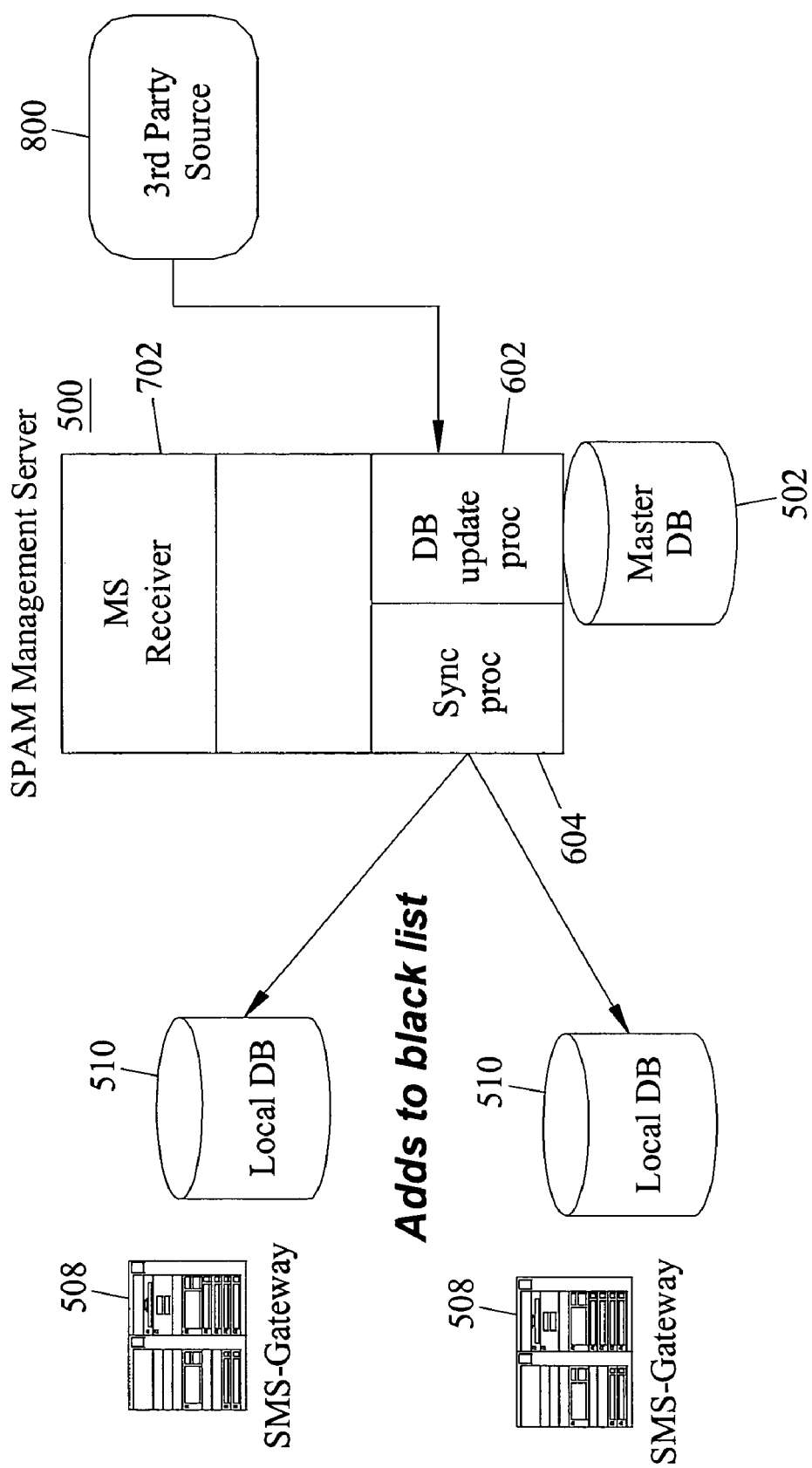
FIG. 8 is a network diagram illustrating a method for distributing an MS screening black list from a third party source to a plurality of geographically distributed MS gateways according to an embodiment of the subject matter described herein.

As stated above, MS messages can be screened based on black list information provided by third parties. FIG. 8 illustrates this scenario. In FIG. 8, a third party source 800 provides identification information for known spam message sources. Database update process 602 updates master database 502 with this information. Sync process 604 distributes the updates to local database 510. This scenario assumes that a reputable third party is providing a list of originators that are known sources of spam, and that the carrier wants to block all messages from these sources, unless a subscriber has that source on his white list or has opted out of all message filtering.

Carrier-Specific Black Lists

Figure 9:
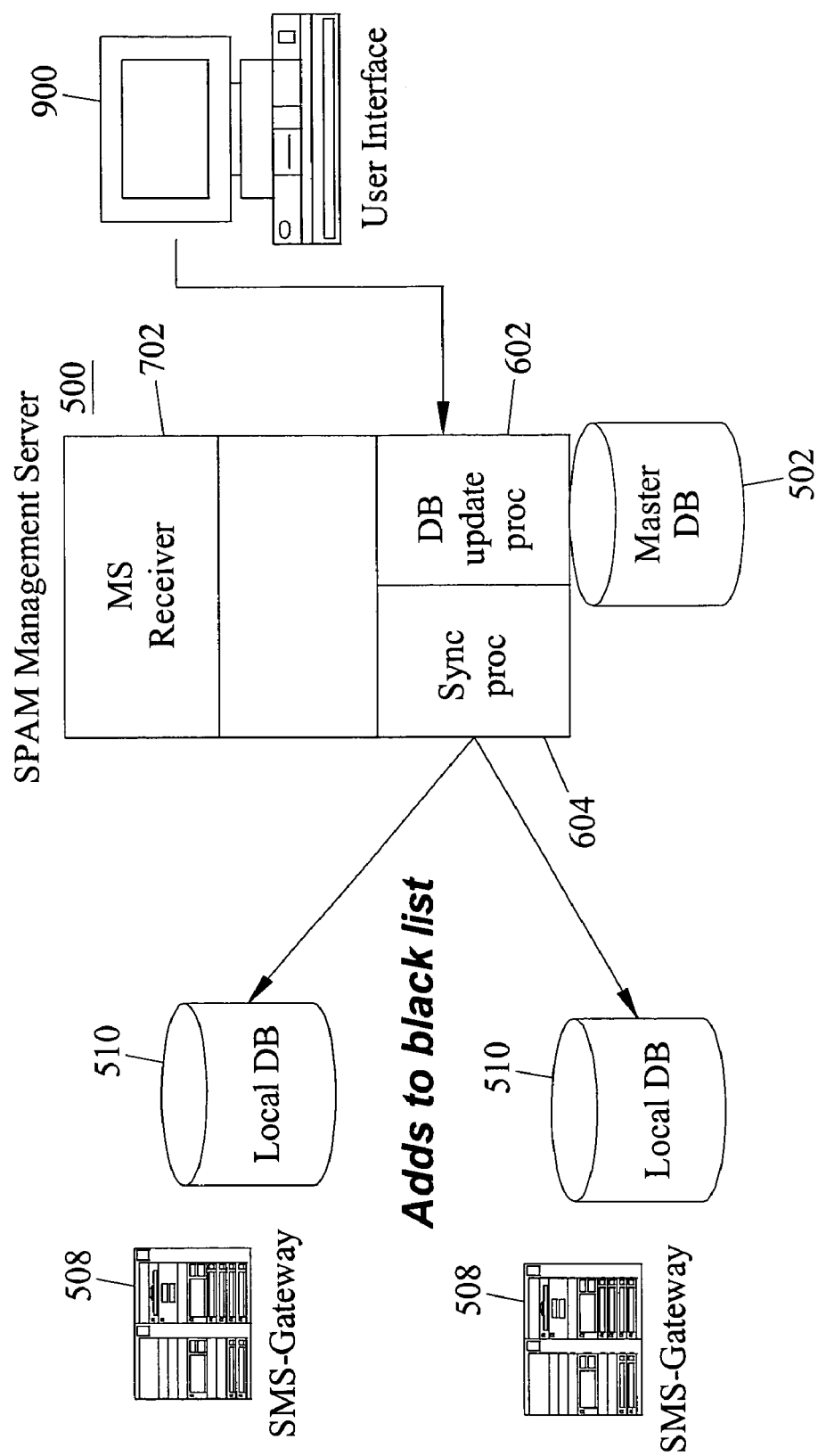
FIG. 9 is a network diagram illustrating a method for distributing a carrier-specific MS screening black list to a plurality of geographically-distributed MS gateways according to an embodiment of the subject matter described herein.

According to another aspect of the subject matter described herein, MS message screening may be performed based on a carrier-specific black list. As used herein, a carrier-specific black list is a list that contains origination IDs (mobile and non-mobile) that the carrier wants to ban within its network. FIG. 9 illustrates a method for provisioning a carrier-specific black list according to an embodiment of the subject matter described herein. Referring to FIG. 9, a carrier-specific black list may be manually provisioned via user interface 900 at spam management server 500. Database update process 602 may populate database 502 with the carrier specific black list. Sync procedure 604 may distribute the carrier-specific black list to local databases 510 Each SMS gateway 508 may then use the carrier specific black lists to unconditionally block SMS messages from anyone on this list.

Subscriber Black Lists—Web-Based

Figure 10:
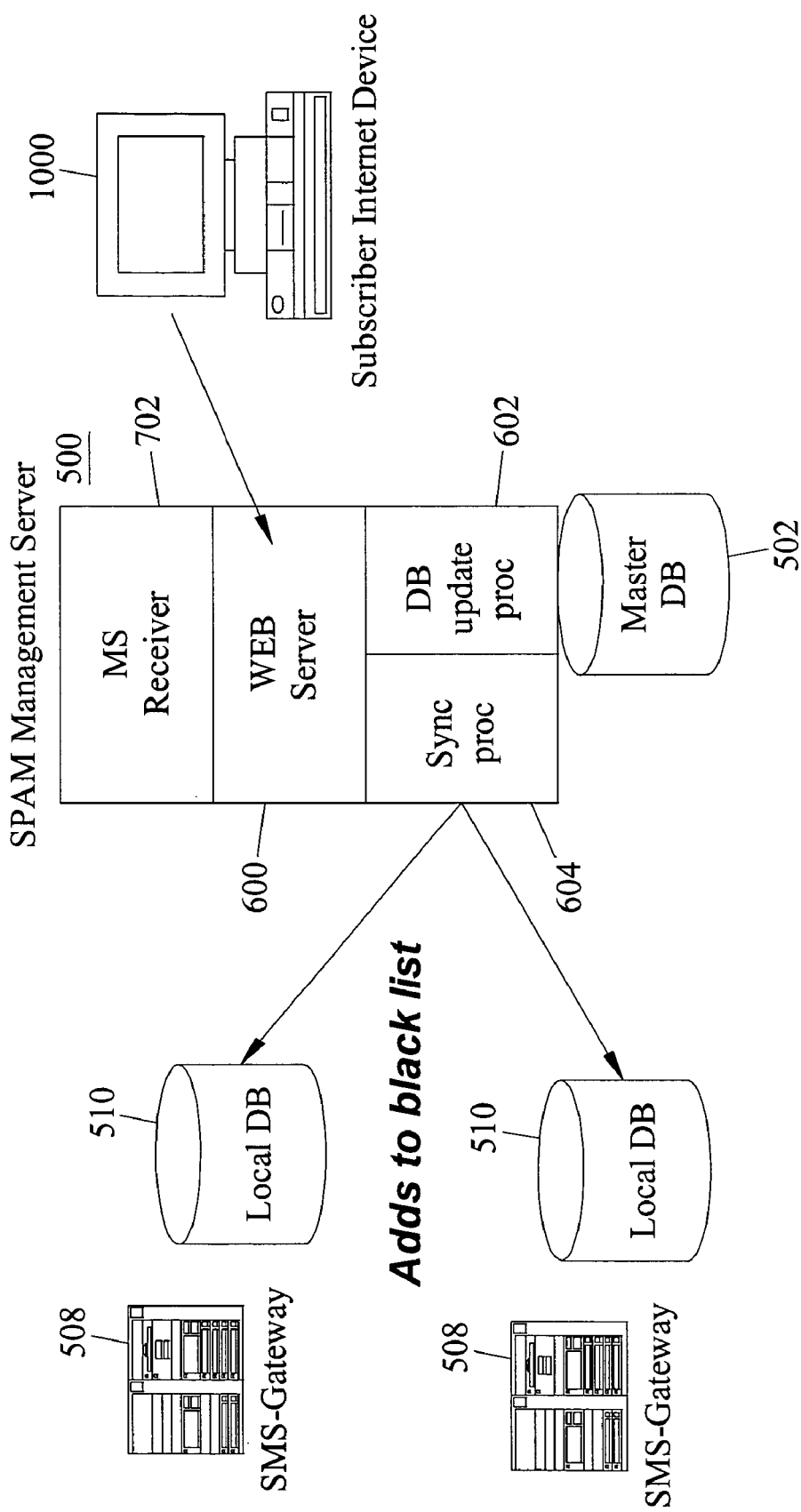
FIG. 10 is a network diagram illustrating a method for distributing a subscriber-specific MS screening black list to a plurality of geographically distributed MS gateways according to an embodiment of the subject matter described herein.

As stated above with regard to the routing node screening example, individual subscribers can maintain their own personal lists of originators whose MS messages they want to block. FIG. 10 illustrates a method for provisioning subscriber black lists to a plurality of geographically distributed SMS screening databases according to an embodiment of the subject matter described herein. Referring to FIG. 10, web server 600 may allow a subscriber to view the current contents of his black list and make changes via subscriber Internet device. As with the previous examples, all changes are made to master database 502 on spam management server 500 and then automatically synchronized to the SMS gateway local databases 502.

Subscriber Black Lists—SMS Based

In addition to automatically provisioning white lists based on SMS messages deemed acceptable by a subscriber, the subject matter described herein may also include automatically provisioning subscriber black lists based on SMS messages rejected by the subscriber. As used herein, an SMS-based subscriber black list a list that list contains originators whose SMS messages were received by the subscriber and deemed to be spam. Like the dynamic white list described above with regard to FIG. 7, in this scenario the subscriber may use a short code or other mechanism to forward the offending message to spam management server 500. Spam management server 500 may then add the offending originator ID to the subscriber's personal black list in master database 502 and synchronize the entry to local SMS Gateway databases 510. Thus, geographically distributed SMS screening database may be automatically updated based on an SMS message identified as spam by a subscriber. Such a method is superior to manual provisioning methods that require a subscriber to manually enter SMS screening parameters via the subscriber's handset or via a computer terminal.

Cross-Subscriber Black Lists

In this scenario, individual subscriber black lists are searched and compared to determine if the same originators appear in a significant number of personal lists. Based on configurable thresholds, the system can add those common originators to a common blocking list. At that point, further MS messages from those originators would be blocked for all subscribers except those with specific white list entries or blanket opt-in settings.

Subscriber Content Lists

According to another aspect of the subject matter described herein, databases 502 and 510 may store subscriber content lists. Subscriber content lists are lists of specific words (and possibly phrases) that an individual subscriber has designated as prohibited or allowed. If content screening is invoked, then all MS message text is compared to the list and the message is blocked or allowed if any or a predetermined number of words match.

Carrier-level Law Enforcement Tracking Lists

According to yet another aspect of the subject matter described herein, SMS management server 500 may maintain carrier level law enforcement tracking lists. These lists may include the following sub-lists:

a list of originator identifiers;

a list of termination identifiers; and a list of trapped message contents.

This feature assumes that law enforcement agencies can require carriers to "wire tap" SMS messages from and/or to specific parties and log their activity and message text. It may also be useful to the carrier to collect evidence of spamming for possible civil actions or government reporting.

Velocity/Address Violation Threshold Lists

As stated above, spam SMS messages can be identified based on the number of messages from a particular source exceeding a threshold. In the examples illustrated in FIGS. 5–10, each SMS gateway 508 can attempt to identify a spam attack based on the appearance of an unusually high number of SMS messages from a single source or by an unusually high number of sequential destinations, etc. The threshold for triggering a violation would be configurable by the carrier.

In a network where there are multiple SMS gateways, it is possible that one single gateway will not detect enough instances to trigger a violation, but the sum of the instances at all of the gateways exceeds the threshold. Accordingly, it is desirable to implement a method for identifying velocity violations where different nodes perform message screening. The network in FIG. 5 can be used to illustrate one exemplary method. In this scenario, the total threshold value for identifying SMS messages as spam may be divided equally among the SMS gateways 508, so that each gateway 508 has a local threshold that is lower than the system threshold. If a gateway 508 detects a violation based on its local threshold, it reports the details to spam management server 500, which maintains a composite database of violation information. Spam management server 500 analyzes the individual gateways' violation information to determine if the system-wide instances actually exceed the network threshold. If the network threshold is exceeded, then spam management server 500 can add the offending originator to the Violators Black List and synchronize it to all of the gateways 508.

It is understood that any of the methods described or claimed herein can be implemented as a computer program product comprising computer executable instructions embodied in a computer readable medium. The computer-executable instructions may implement the steps in the described or claimed method.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for screening messaging service (MS) messages, the method comprising:

at a network signaling node separate from a short message service center (SMSC):

(a) receiving an MS message that includes message recipient identification information and MS content;

(b) performing a lookup in a content-based MS screening rule database including content-based screening rules associated with at least one message recipient using the message recipient identification and MS content Information; and (c) in response to locating a matching entry performing a screening action specified by the entry, wherein performing steps (a)–(c) at a network signaling node separate from an SMSC includes performing steps (a)–(c) at a network signaling node selected from the group consisting of a signaling message routing node, a message service gateway, an SMS gateway, and a wireless application protocol (WAP) gateway.

2. The method of claim 1 wherein receiving a MS signaling message includes receiving a mobile application part (MAP) based short message service (SMS) message.

3. The method of claim 2 wherein receiving a MAP-based SMS message includes receiving a MAP FORWARD-SHORT-MESSAGE.

4. The method of claim 2 wherein receiving a MAP-based SMS message includes receiving an Internet protocol (IP)-encapsulated MAP based SMS message.

5. The method of claim 4 wherein receiving an IP-encapsulated MAP based SMS message includes receiving an Internet Engineering Task Force (IETF) SIGTRAN signaling connection control part (SCCP) user adaptation (SUA) message.

6. The method of claim 1 wherein receiving an MS message includes receiving a session initiation protocol (SIP)-based SMS message.

7. The method of claim 1 wherein receiving an MS message includes receiving a wireless application protocol (WAP) M-SEND.REQ message.

8. The method of claim 1 wherein performing a lookup includes performing the lookup using message originator information.

9. The method of claim 1 wherein performing the lookup using message content information includes performing the lookup using message content attributes.

10. The method of claim 1 wherein performing a screening action includes, in response to locating a matching entry that indicates that the MS content is allowed, routing the MS message to the recipient.

11. The method of claim 1 wherein performing a screening action includes, in response to locating a matching entry that indicates that the MS content is to be redirected to an alternate destination, routing the MS message to the alternate destination.

12. The method of claim 1 wherein performing a screening action includes discarding the MS message and generating a new message that notifies the MS message originator that the MS message was not delivered.

13. The method of claim 1 wherein performing a screening action includes discarding the MS message and generating a new message that notifies a policing authority that the MS message originator has attempted to send an MS message with undesirable content.

14. The method of 13 claim where the policing authority is a network operator.

15. The method of claim 13 where the policing authority is a government agency.

16. The method of claim 1 wherein the content-based MS screening rules associated with the at least one message recipient are provisioned by the at least one recipient.

17. The method of claim 16 wherein the content-based MS screening rules are provisioned via a web interface.

18. The method of claim 1 wherein steps (a)–(c) are performed for the MS message before the message is received by a store-and-forward network element.

19. The method of claim 18 wherein the store-and-forward network element includes a short message service center (SMSC).

20. The method of claim 18 wherein the store-and-forward network element includes a multimedia messaging service (MMS) relay/server.

21. The method of claim 1 wherein performing steps (a)–(c) at a network signaling node separate from the SMSC Includes performing steps (a)–(c) at a signaling message routing node.

22. The method of claim 1 wherein performing steps (a)–(c) at a network signaling node separate from the SMSC includes performing steps (a)–(c) at an SMS gateway.

23. The method of claim 1 wherein performing steps (a)–(c) at a network signaling node separate from the SMSC includes performing steps (a)–(c) at a WAP gateway.

24. The method of claim 1 wherein performing steps (a)–(c) at a network signaling node separate from the SMSC includes performing steps (a)–(c) at the signaling node without requiring that the message be redirected to the signaling node.

25. A method for dynamic, content-based screening of SMS messages:
   (a) receiving a copy of a messaging service (MS) message that a message recipient has identified as containing wanted or unwanted MS content;
   (b) identifying a sender of the MS message;
   (c) in response to the message being identified as containing unwanted content, automatically populating at least one MS screening database to block future messages from the sender of the MS message; and
   (d) In response to the message being identified as containing wanted content, automatically populating at least one MS screening database to allow future messages from the sender of the MS message.

26. A method for dynamically generating and using a messaging service (MS) content screening rule, the method comprising:
   (a) analyzing a plurality of MS content elements, the MS content elements each being identifiable as wanted or unwanted;
   (b) based on a combination of a least two of the MS content elements, automatically generating at least one content-based MS screening rule and automatically populating a message service screening database with the content-based screening rule; and
   (c) using the content-based MS screening rule to screen MS messages intended for a recipient.

27. The method of claim 26 wherein analyzing a plurality of MS content elements includes analyzing MS content from a plurality of messages blocked by a content-based MS screening application.

28. The method of claim 27 wherein analyzing a plurality of MS content elements includes analyzing MS content from a plurality of messages allowed by the content-based MS screening application.

29. A method for screening messaging service (MS) messages based on an MS content type identifier:
   (a) receiving an MS message that includes message recipient information and MS content;
   (b) extracting an MS content type identifier from the message; and
   (c) performing a screening action based on the MS content type identifier, wherein steps (a)–(c) are Performed at a network signaling node selected from the group consisting of a signaling message routing node, a message service gateway, a short message service (SMS) gateway, and a wireless application protocol (WAP) gateway.

30. The method of claim 29 wherein performing a screening action based on the MS content type identifier includes discarding the MS message in response to determining that the MS message does not include an MS content type identifier.

31. The method of claim 29 wherein performing a screening action based on the MS content type identifier includes screening the message in response to determining that the MS content type identifier has a user specified value.

32. A method for identifying spain messaging service (MS) messages, the method comprising:
   (a) analyzing content from a plurality of MS messages;
   (b) determining whether a number of MS messages having identical content within a predetermined time period has a predetermined relationship with regard to a threshold; and
   (c) in response to determining that the number has the predetermined relationship with regard to the threshold, identifying the MS messages having identical content as spam.

33. A method for distributing messaging service screening data to a plurality of geographically distributed messaging service (MS) message content screening nodes, the method comprising:
   (a) receiving an MS message content screening information at an MS management server;
   (b) storing the MS message content screening information in a master database local to the MS management server; and
   (c) detecting a change in the MS message content screening information at the master database;
   (d) in response to detecting the change, automatically synchronizing a plurality of local databases located at a plurality of geographically distributed MS message content screening nodes with the MS message content screening information stored in the master database.

34. The method of claim 33 wherein receiving MS message content screening information includes receiving MS message content screening information from a mobile subscriber.

35. The method of claim 34 wherein receiving MS message content screening information from a mobile subscriber includes receiving an unwanted MS message forwarded by the mobile subscriber.

36. The method of claim 34 wherein receiving MS message content screening information from a mobile subscriber includes receiving MS message content screening information provisioned by a mobile subscriber via a provisioning interface.

37. The method of claim 33 wherein receiving MS message content screening information Includes receiving MS message content screening information from a source other than a mobile subscriber.

38. The method of claim 37 wherein the source comprises a carrier.

39. The method of claim 38 wherein the source comprises a party other than the mobile subscriber or the carrier.

40. The method of claim 33 wherein receiving MS message content screening information includes receiving a subscriber-specific white list.

41. The method of claim 33 wherein receiving MS message content screening information includes receiving a subscriber-specific black list.

42. The method of claim 33 wherein receiving MS message content screening information includes receiving a third party black list.

43. A method for identifying spain messaging service (MS) messages using a plurality of geographically distributed MS message screening nodes, the method comprising:
(a) at each of a plurality of MS message screening nodes, determining when a number of MS messages from an MS source has a predetermined relationship with respect to a local threshold, each local threshold being based on a system-wide threshold, and, in response, notifying an MS screening manager that the predetermined relationship exists; and
(b) at the MS screening manager, receiving at least one notification from at least one of the MS message screening nodes that the number of MS messages has the predetermined relationship with respect to the local threshold, in response to the at least one notification, determining whether system-wide threshold has been exceeded, and, in response to determining that the system-wide threshold has been exceeded, identifying the MS messages as spain MS messages.

44. A network signaling node for content-based screening of messaging service (MS) messages, the network signaling node being separate from a short message service center (SMSC), the network signaling node comprising:
(a) a communication module for receiving an MS message that includes message recipient identification information and MS content from a communication network; and
(b) a content-based MS screening function for locating a content-based screening rule corresponding to the MS content and the message recipient information and for performing a corresponding screening action, wherein the network signaling node comprises a node selected from the group consisting of a signaling message routing node, a message service gateway, and a wireless application protocol gateway.

45. The network signaling node of claim 44 wherein the communication module comprises a signaling system 7 (SS7) link Interface module (LIM).

46. The network signaling node of claim 44 wherein the communication module comprises an Internet protocol (IP) data communication module (0CM).

47. The network signaling node of claim 44 wherein the content-based MS screening function is adapted to discard the received MS message in response to locating a matching screening rule.

48. The network signaling node of claim 44 wherein the content-based MS screening function is adapted to generate a notification message in response to discarding the MS message.

49. The network signaling node of claim 44 wherein the content-based MS screening function is adapted to pass the received MS message in response to locating a matching screening rule.

50. The network signaling node of claim 44 wherein the content-based MS screening function is adapted to redirect the received MS message to an alternate destination in response to locating a matching screening rule.

51. The network signaling node of claim 44 wherein the communication module and the content-based MS screening function are components of a signal transfer point (STP) node.

52. The network signaling node of claim 44 wherein the communication module and the content-based MS screening function are components of a signaling gateway (SG) node.

53. The network signaling node of claim 44 wherein the communication module and the content-based MS screening function are components of a wireless application protocol (WAP) gateway.

54. The network signaling node of claim 44 wherein the communication module and the content-based MS screening function are components of a store-and-forward network element.

55. The system of claim 54 wherein the store-and-forward network element is a short message gateway.

56. The network signaling node of claim 54 wherein the store-and-forward network element is a multimedia message service (MMS) relay/server.

57. The network signaling node of claim 44 wherein the communication module and the content-based MS screening function are components of a signaling message muting node.

58. The network signaling node of claim 44 comprising a provisioning interface for allowing a user to provision content-based screening rules used by the content-based MS screening function to screen MS messages for the user.

59. The network signaling node of claim 58 wherein the provisioning interface comprises a web interface.

60. The network signaling node of claim 44 wherein an MS message includes a mobile application part (MAP) based SMS message.

61. The network signaling node of claim 44 wherein the MS message includes an Internet protocol (IP) encapsulated MAP based SMS message.

62. The network signaling node of claim 61 wherein the IP encapsulated MAP based SMS message is an Internet Engineering Task Force (IETF) SIGTRAN signaling connection control part (SCCP) user adaptation (SUA) message.

63. The network signaling node of claim 44 wherein the MS message includes a session initiation protocol (SIP) based MS message.

64. A computer program product comprising computer-executable instructions embodied in a computer-readable medium for performing steps comprising:
at a network signaling node separate from a short message service center,
(a) receiving a message service (MS) message that includes message recipient identification information and MS content;
(b) performing a lookup in a content-based MS screening rule database using the message recipient Identification and the MS content; and
(c) in response to locating a matching entry performing a screening action specified by the entry, wherein performing steps (a)–(c) at a network signaling mode separate from an SMSC includes performing steps (a)–(c) at a network signaling node selected from the group consisting of a signaling message routing node, a message service gateway, a short message service (SMS) gateway, and a wireless application protocol (WAP) gateway.

* * * * *

UNITED STATES PATENT AND TRADEMARK OFFICE
CERTIFICATE OF CORRECTION

PATENT NO. : 7,155,243 B2 Page 1 of 1
APPLICATION NO. : 11/153095
DATED : December 26, 2006
INVENTOR(S) : Patricia A. Baldwin and Peter J. Marsico It is certified that error appears in the above-identified patent and that said Letters Patent is hereby corrected as shown below:

Col. 24, line 10
 replace "spain"
 with --spam--.

Signed and Sealed this

Sixteenth Day of December, 2008

JON W. DUDAS
*Director of the United States Patent and Trademark Office*